US012082061B2

(12) United States Patent
Rune et al.

(10) Patent No.: US 12,082,061 B2
(45) Date of Patent: Sep. 3, 2024

(54) CONDITIONAL HANDOVER EXECUTION PROBABILITY INFORMATION TO POTENTIAL TARGET NODE

(71) Applicant: Telefonaktiebolaget LM Ericsson (publ), Stockholm (SE)

(72) Inventors: Johan Rune, Lidingö (SE); Cecilia Eklöf, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 401 days.

(21) Appl. No.: 17/442,950

(22) PCT Filed: Feb. 3, 2020

(86) PCT No.: PCT/SE2020/050094
§ 371 (c)(1),
(2) Date: Sep. 24, 2021

(87) PCT Pub. No.: WO2020/197459
PCT Pub. Date: Oct. 1, 2020

(65) Prior Publication Data
US 2022/0191752 A1 Jun. 16, 2022

Related U.S. Application Data

(60) Provisional application No. 62/825,177, filed on Mar. 28, 2019.

(51) Int. Cl.
*H04W 36/00* (2009.01)
*H04W 36/32* (2009.01)

(52) U.S. Cl.
CPC . *H04W 36/00837* (2018.08); *H04W 36/0058* (2018.08); *H04W 36/008375* (2023.05); *H04W 36/32* (2013.01)

(58) Field of Classification Search
CPC ....... H04W 36/00837; H04W 36/0058; H04W 36/008375; H04W 36/32; H04W 36/36; H04W 36/324; H04W 36/362
See application file for complete search history.

(56) References Cited

U.S. PATENT DOCUMENTS

2011/0250891 A1 10/2011 Zou et al.
2018/0220344 A1* 8/2018 Shaheen ................. H04W 4/60
2022/0386197 A1* 12/2022 Hwang ........... H04W 36/00835

FOREIGN PATENT DOCUMENTS

CN 108391301 A 8/2018
CN 108702670 A 10/2018
(Continued)

OTHER PUBLICATIONS

Unknown, Author, "On Validity Timer for Conditional Handover in LTE", 3GPP TSG RAN WG2 #106, R2-1906201 (Revision of R2-1903890), Reno, USA, May 13-18, 2019, 1-9.
(Continued)

*Primary Examiner* — Nizam U Ahmed
(74) *Attorney, Agent, or Firm* — Murphy, Bilak & Homiller, PLLC

(57) ABSTRACT

According to an aspect, a source node determines (1002) that a UE served by the source node is a candidate for conditional handover configuration. The source node sends (1004), to a target node for conditional handover of the UE, a conditional handover request that includes one or more parameters indicative of a likelihood that handover of the UE to the target node will be executed. The target node receives (1102) the request and parameters and allocates (1104) resources for the UE, taking into account the likelihood that handover of the first UE to the target node will be executed. The target node sends (1106) handover configu-
(Continued)

ration information for the first UE to the source node, in response to the conditional handover request.

18 Claims, 14 Drawing Sheets

(56) References Cited

FOREIGN PATENT DOCUMENTS

| CN | 109392039 | A | 2/2019 |
|---|---|---|---|
| CN | 109495935 | A | 3/2019 |
| CN | 110536365 | A | 12/2019 |
| EP | 2410789 | A1 | 1/2012 |
| EP | 3282772 | A1 | 2/2018 |
| EP | 4007362 | A1 | 6/2022 |
| WO | 2016130062 | A1 | 8/2016 |
| WO | 2018171518 | A1 | 9/2018 |
| WO | 2018203716 | A1 | 11/2018 |

OTHER PUBLICATIONS

Unknown, Author, "Signalng procedure for conditional handover", 3GPP TSG-RAN WG2 Meeting #105, R2-1900510 (Revision of R2-1816334), Athens, Greece, Feb. 25-Mar. 1, 2019, 1-4.

3GPP, "3rd Generation Partnership Project; Technical Specification Group Radio Access Network; NG-RAN; Xn application protocol (XnAP) (Release 15)", 3GPP TS 38.423 V15.1.0, Sep. 2018, pp. 1-263.

3GPP, "3rd Generation Partnership Project; Technical Specification Group Radio Access Network; NR; Radio Resource Control (RRC) protocol specification (Release 15)", 3GPP TS 38.331 V15.4.0, Dec. 2018, pp. 1-474.

3GPP, "3rd Generation Partnership Project; Technical Specification Group Radio Access Network; NG-RAN; Xn general aspects and principles (Release 15)", 3GPP TS 38.420 V15.2.0, Dec. 2018, pp. 1-15.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.1.0, Mar. 2018, pp. 1-786.

3GPP, "3rd Generation Partnership Project; Technical Specification Group Radio Access Network; NG-RAN; NG Application Protocol (NGAP) (Release 15)", 3GPP TS 38.413 V15.2.0, Dec. 2018, pp. 1-308.

3GPP, "3rd Generation Partnership Project; Technical Specification Group Radio Access Network; NG-RAN; Xn application protocol (XnAP) (Release 15)", 3GPP TS 38.423 V15.2.0, Dec. 2018, pp. 1-281.

3GPP, "3rd Generation Partnership Project; Technical Specification Group Radio Access Network; NR; NR and NG-RAN Overall Description; Stage 2 (Release 15)", 3GPP TS 38.300 V15.4.0, Dec. 2018, pp. 1-97.

3GPP, "3rd Generation Partnership Project; Technical Specification Group Radio Access Network; NR; NR and NG-RAN Overall Description; Stage 2 (Release 15)", 3GPP TS 38.300 V15.0.0, Dec. 2017, pp. 1-68.

3GPP, "3rd Generation Partnership Project; Technical Specification Group Services and System Aspects; Procedures for the 5G System; Stage 2 (Release 15)", 3GPP TS 23.502 V15.0.0, Dec. 2017, pp. 1-258.

3GPP, "3rd Generation Partnership Project; Technical Specification Group Services and System Aspects; Procedures for the 5G System; Stage 2 (Release 15)", 3GPP TS 23.502 V15.4.1, Jan. 2019, pp. 1-347.

3GPP, "3rd Generation Partnership Project; Technical Specification Group Services and System Aspects; Security architecture and procedures for 5G system (Release 15)", 3GPP TS 33.501 V15.3.1, Dec. 2018, pp. 1-181.

Ericsson, "Deconfiguration of conditional handover in NR", 3GPP TSG RAN WG2 #105bis, R2-19xxxxx, Xi'an, China, Apr. 8-Apr. 12, 2019, pp. 1-6.

Unknown Author, "Analysis on conditional handover", 3GPP TSG-RAN WG2 #97bis, R2-1703384, Spokane, USA, Apr. 3-7, 2017, pp. 1-7.

* cited by examiner

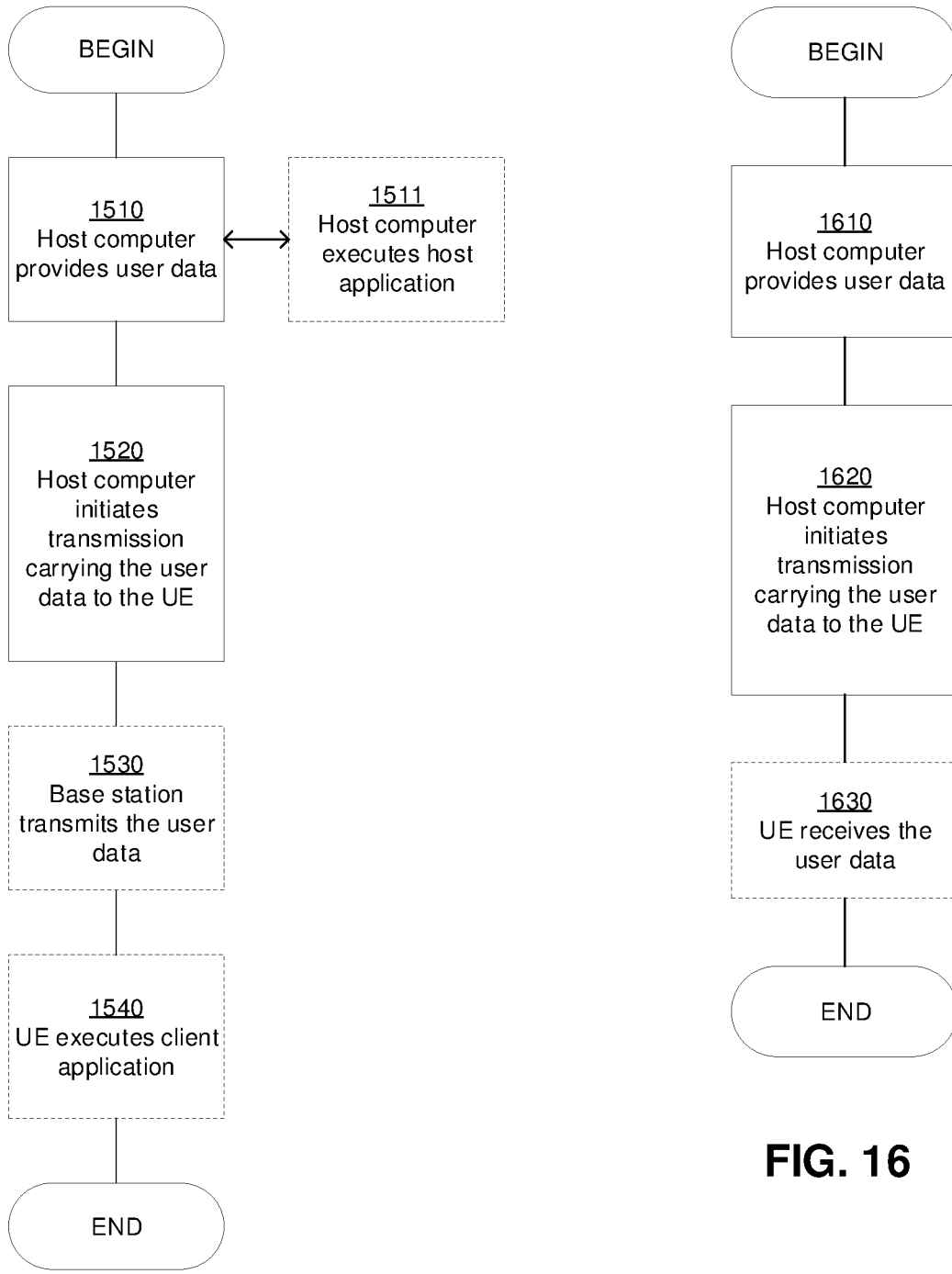

CONDITIONAL HANDOVER EXECUTION PROBABILITY INFORMATION TO POTENTIAL TARGET NODE

TECHNICAL FIELD

The present disclosure generally relates to the field of wireless network communications, and more particularly, to conditional handovers.

BACKGROUND

Mobility of wireless devices connected to wireless communication networks such as the Long Term Evolution (LTE) and New Radio (NR) networks developed by members of the $3^{rd}$-Generation Partnership Project (3GPP) may involve handovers. In 3GPP networks, an end user wireless device is often referred to as a user equipment (UE); when that UE is connected to the network it is described as being in the RRC_CONNECTED state (or mode), where the RRC_CONNECTED state is one of several states defined by the Radio Resource Control (RRC) protocol specified in the 3GPP standards for LTE and NR networks. An RRC_CONNECTED UE in LTE (also called E-UTRA) can be configured by the network to perform measurements. Upon triggering measurement reports, the network may send a handover command to the UE. In LTE, this is an RRConnectionReconfiguration with a field called mobilityControlInfo. In NR, the corresponding command is an RRCReconfiguration with a reconfigurationWithSync field.

These reconfigurations are prepared by the target cell upon a request from the source node. This request is made over an X2 or S1 interface in the case of E-UTRA-EPC, or over an Xn or NG interface in the case of E-UTRA-5GC/E-UTRA-NGC or NR. These reconfigurations take into account the existing RRC configuration the UE has with source cell (which is provided in the inter-node request). Among other parameters, that reconfiguration provided by the target cell contains all the information the UE needs to access the target cell. This information may include, for example, a random access configuration, a new radio network temporary identifier (C-RNTI) assigned by the target cell, and security parameters enabling the UE to calculate new security keys associated with the target cell, so the UE can send a handover complete message on a signaling radio bearer (SRB1) (encrypted and integrity protected) based on new security keys upon accessing the target cell.

FIG. 1 summarizes the signaling between a UE, a source node, a target node, an Access and Mobility Management Function (AMF), and one or more User Plane Functions (UPFs) during a handover procedure in a 5G network. As seen in the figure, user data initially passes between a UPF and the UE via the source gNB. As shown at step 0, mobility control information is provided by the AMF to the source gNB. As shown at step 1, the source gNB and UE perform measurement control and measurement reporting, respectively. Based on the measurement reports, the source gNB makes a handover (HO) decision, as shown at step 2, and sends a handover request to the target gNB, as shown at step 3. After performing admission control, as shown at step 4, the target gNB sends a handover request acknowledgement to the source gNB, as shown at step, which is followed by the source gNB triggering a Uu handover, as shown at step 6, and the sending of a sequence number (SN) status transfer message to the target gNB, as shown at step 6.

After the triggering of the handover, as seen in the figure, the UE detaches from the old cell (the source gNB) and synchronizes to the new cell, while the source gNB delivers any buffered and in transit user data to the target gNB, which buffers user data from the source gNB until the handover to the target gNB is complete. Synchronization of the UE to the new cell and completion of the RRC handover procedure is shown at step 8 of FIG. 1, after which step user data flows between the UE and the UPF or a new UPF via the target gNB. Meanwhile, the target gNB sends a path switch request to the AMF, as shown at step 9, which communicates path-switch-related 5G core network signaling with the UPF(s) to perform the actual downlink (DL) path switch in the UPFs. End markers are sent to the source and target gNBs, as seen in the figure, after which data for the UE flows through the new path from the UPF to the target gNB. A path switch request acknowledgement is sent from the AMF to the target gNB, as shown at step 11, and a UE context release is sent from the target gNB to the source gNB, as shown at step 12, completing the process.

In both LTE and NR, some principles exist for handovers or, in more general terms, for mobility in RRC_CONNECTED mode. Mobility in RRC_CONNECTED is network-based, since the network has the best information regarding the current situation, such as load conditions, resources available in different nodes, available frequencies, etc. The network can also consider the situation of many UEs in the network, from a resource allocation perspective.

For RRC_CONNECTED mobility, the network prepares a target cell before the UE accesses that cell. The source node provides the UE with the RRC configuration to be used in the target cell, including an SRB1 configuration to send a handover complete message.

The UE is provided by the target cell with a target C-RNTI, i.e., the target identifies the UE from MSG.3 on medium access control (MAC) level for the handover complete message. Hence, there is no context fetching, unless a failure occurs.

To speed up the handover, the network provides the UE with information on how to access the target, e.g., a random access channel (RACH) configuration, so the UE does not have to acquire system information prior to the handover. In some instances, the UE may be provided with contention-free RACH (CFRA) resources, in which case the target cell identifies the UE from the preamble (MSG.1). The principle behind this is that the procedure can always be optimized with dedicated resources. In conditional handover (CHO), which is discussed below, this might be a bit tricky, as there is uncertainty about not only the final target but also the timing.

3GPP is developing mobility enhancements in LTE and NR. The main objectives are to improve the robustness at handover and to decrease the interruption time at handover. One problem related to robustness at handover is that the HO command, e.g., an RRCConnectionReconfiguration message with mobilityControlInfo or an RRCReconfiguration with a reconfigurationWithSync field), is normally sent when the radio conditions for the UE are already quite bad. As a result, the HO command may not reach the UE in time if the message is segmented or there are retransmissions.

In LTE and NR, there are different solutions to increase mobility robustness. One solution for NR is called "conditional handover" or "early handover command." To avoid an undesired dependence on the serving radio link at the time and radio conditions where the UE should execute the handover, it should be possible to provide RRC signaling for the handover to the UE earlier. To achieve this, the HO command may be associated with a condition, based, for example, on radio conditions similar to those associated with an A3 event, where a given neighbor becomes X dB better than the target cell. As soon as the condition is fulfilled, the UE executes the handover in accordance with the provided handover command or conditional handover command.

Such a condition could, for example, be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo for LTE, or RRCReconfiguration with a reconfigurationWithSync, for NR, at a time when the radio link between the source cell and the UE is still stable. The execution of the handover is done at a later point in time (and threshold) that is considered optimal for the handover execution.

This early handover command, which may be referred to as a CHO Command, may, for example, come in the form of a Conditional RRC Reconfiguration or Conditional RRC Connection Reconfiguration. FIG. 2 depicts an example of a conditional handover procedure with one or more potential target cells. As seen in the figure, user plane data is initially flowing between the UE and a source/serving gNB or eNB. The UE provides the source/serving gNB or eNB with a measurement report, based on the lower threshold discussed above. The source/serving gNB or eNB then makes a conditional HO decision, based on this report, which can be considered an early report, since the lower threshold for reporting means that it is reported earlier (at a lower threshold) than it would have been reported otherwise. The source/serving gNB or eNB then sends a CHO request to the target gNB or eNB, which may be regarded as a potential target, since handover to this gNB or eNB may or may not occur. The source/serving gNB or eNB may send similar requests to one or more other potential target gNBs or eNBs. As seen in the figure, all of these potential target gNBs or eNBs respond with a CHO request acknowledgement, which includes a RRC configuration for use in the event that the handover is performed.

As further seen in the figure, the source/serving gNB or eNB then sends a CHO command to the UE. This CHO command has a high threshold, compared to the lower threshold used in reporting the target cell. When measurements performed by the UE fulfill the CHO trigger condition, based on the high threshold, the UE triggers execution of the CHO, by synchronizing to the target gNB or eNB and performing random access. When this is complete, the UE sends a HO complete message, e.g., a RRCReconfiguration-Complete or RRCConnectionReconfigurationComplete message to the target gNB or eNB, after which user plane (UP) data flows between the UE and the target gNB or eNB, a path switch is completed, and a UE context release is sent from the target gNB or eNB to the source gNB or eNB.

In practice, there may often be multiple cells or beams that the UE reported as possible candidates for handover, based on its preceding RRM measurements. The network should then have the freedom to issue CHO commands for several of those candidates. The RRCConnectionReconfiguration for each of those candidates may differ in terms of the handover execution condition, e.g., the reference signal to measure and threshold to exceed, as well as in terms of the random access preamble to be sent when a condition is met.

While the UE evaluates the condition, it should continue operating per its current RRC configuration, i.e., without applying the CHO command. When the UE determines that the condition is fulfilled, it disconnects from the serving cell, applies the CHO command and connects to the target cell. These latter steps are equivalent to the current, instantaneous handover execution.

An alternative solution relies on context fetching by the target cell. With this approach, a condition is also provided to the UE. Upon the fulfillment of the condition the UE executes RRC Resume or an equivalent procedure, towards at least one target cell, which then retrieves the UE context from the source cell. FIG. 3 illustrates this conditional resume procedure. In general terms, both conditional handover and conditional resume may be considered to be conditional mobility procedures.

The process shown in FIG. 3 overlaps considerably with the process of FIG. 2. Again, user plane data is initially flowing between the UE and a source/serving gNB or eNB. The UE provides the source/serving gNB or eNB with a measurement report, based on the lower threshold discussed above. The source/serving gNB or eNB then makes a conditional resume decision based on this early report. This conditional resume decision is analogous to the conditional handover decision illustrated in FIG. 2.

As further seen in FIG. 3, the source/serving gNB or eNB then sends a conditional resume command to the UE. Like the CHO command shown in FIG. 2, the conditional resume command shown in FIG. 3 has a high threshold, compared to the lower threshold used in reporting the target cell. When measurements performed by the UE fulfill the conditional resume trigger condition, based on the high threshold, the UE triggers execution of the conditional resume, by synchronizing to the target gNB or eNB and performing random access. When this is complete, the UE sends a resume request message to the target gNB or eNB. The potential target gNB or eNB, which is now an actual target gNB or eNB, sends a retrieve UE context request to the source/serving gNB or eNB, which responds with a retrieve UE context response. The target gNB or eNB then sends a resume message to the UE, which responds with a resume complete message, after which user plane (UP) data flows between the UE and the target gNB or eNB, a path switch is completed, and a UE context release is sent from the target gNB or eNB to the source gNB or eNB. In NR and LTE, two inter-node messages are typically used for handover: HandoverPreparationInformation and HandoverCommand. When the source node decides to hand over the UE, the source node provides the target node with some information in the HandoverPreparationInformation that enables the target node to prepare an RRCReconfiguration (provided in the HandoverCommand) to be used in the target cell upon handover execution. Definitions from 3GPP TS 38.331, v15.4.0, are shown below, where a HandoverPreparationInformation message (source gNB/source RAN to target gNB) is used to transfer the NR RRC information used by the target gNB during handover preparation, including UE capability information:

```
***** Begin message definition **************************
-- ASN1START
-- TAG-HANDOVER-PREPARATION-INFORMATION-START
HandoverPreparationInformation ::= SEQUENCE {
```

-continued

```
        criticalExtensions             CHOICE {
            c1                         CHOICE{
                handoverPreparationInformation              HandoverPreparationInformation-
IEs,
                spare3 NULL, spare 2 NULL, spare1 NULL
            },
            criticalExtensionsFuture           SEQUENCE { }
        }
    }
    HandoverPreparationInformation-IEs ::= SEQUENCE {
        ue-CapabilityRAT-List              UE-CapabilityRAT-ContainerList,
        sourceConfig                       AS-Config               OPTIONAL, -- Cond HO
        rrm-Config                         RRM-Config              OPTIONAL,
        as-Context                         AS-Context              OPTIONAL,
        nonCriticalExtension               SEQUENCE { }                       OPTIONAL
    }
    AS-Config ::=           SEQUENCE {
        rrcReconfiguration            OCTET STRING (CONTAINING
    RRCReconfiguration),
        ...
    }
    AS-Context ::=                  SEQUENCE {
        reestablishmentInfo             ReestablishmentInfo            OPTIONAL,
        configRestrictInfo              ConfigRestrictInfoSCG                    OPTIONAL,
        ...,
        [[ ran-NotificationAreaInfo             RAN-NotificationAreaInfo              OPTIONAL
        ]]
    }
    ReestablishmentInfo ::=             SEQUENCE {
        sourcePhysCellId                    PhysCellId,
        targetCellShortMAC-I                    ShortMAC-I,
        additionalReestabInfoList               ReestabNCellInfoList
    OPTIONAL
    }
    ReestabNCellInfoList ::=              SEQUENCE ( SIZE (1..maxCellPrep) ) OF
    ReestabNCellInfo
    ReestabNCellInfo::=          SEQUENCE{
        cellIdentity                 CellIdentity,
        key-gNodeB-Star                  BIT STRING (SIZE (256)),
        shortMAC-I                   ShortMAC-I
    }
    RRM-Config ::=                SEQUENCE {
        ue-InactiveTime              ENUMERATED {
                        s1, s2, s3, s5, s7, s10, s15, s20,
                        s25, s30, s40, s50, min1, min1s20c, min1s40,
                        min2, min2s30, min3, min3s30, min4, min5, min6,
                        min7, min8, min9, min10, min12, min14, min17, min20,
                        min24, min28, min33, min38, min44, min50, hr1,
                        hr1min30, hr2, hr2min30, hr3, hr3min30, hr4, hr5, hr6,
                        hr8, hr10, hr13, hr16, hr20, day1, day1hr12, day2,
                        day2hr12, day3, day4, day5, day7, day10, day14, day19,
                        day24, day30, dayMoreThan30}                      OPTIONAL,
        candidateCellInfoList                 MeasResultList2NR                     OPTIONAL,
        ...
    }
    -- TAG-HANDOVER-PREPARATION-INFORMATION-STOP
    -- ASN1STOP
***** End message definition **************************
```

Tables 1-4 provide further related information.

TABLE 1

| HandoverPreparationInformation field descriptions |
|---|
| as-Context |
| Local RAN context required by the target gNB. |
| sourceConfig |
| The radio resource configuration as used in the source cell. |
| rrm-Config |
| Local RAN context used mainly for RRM purposes. |
| ue-CapabilityRAT-List |
| The UE radio access related capabilities concerning RATs supported by the UE. FFS whether certain capabilities are mandatory to provide by source e.g. of target and/or source RAT. |

TABLE 2

| Conditional Presence | Explanation |
|---|---|
| HO | The field is mandatory present in case of handover within NR; The field is optionally present in case of handover from E-UTRA connected to 5GC; otherwise the field is not present. |

Table 3 indicates, per source RAT, whether RAT capabilities are included or not.

TABLE 3

| Source RAT | NR capabilities | E-UTRA capabilities | MR-DC capabilities |
|---|---|---|---|
| NR | Included | May be included | May be included |
| E-UTRAN | Included | May be included | May be included |

TABLE 4

RRM-Config field descriptions candidateCellInfoList
A list of the best cells on each frequency for which measurement information was available A HandoverCommand message is used to transfer the handover command as generated by the target gNB. The direction is from the target gNB to the source gNB/source RAN.

```
***** Begin message definition ***************************
-- ASN1START
-- TAG-HANDOVER-COMMAND-START
HandoverCommand ::=             SEQUENCE {
    criticalExtensions          CHOICE {
        c1                      CHOICE{
            handoverCommand             HandoverCommand-IEs,
            spare3 NULL, spare2 NULL, spare1 NULL
        },
        criticalExtensionsFuture        SEQUENCE { }
    }
}
HandoverCommand-IEs ::=         SEQUENCE {
    handoverCommandMessage          OCTET STRING (CONTAINING
RRCReconfiguration),
    nonCriticalExtension            SEQUENCE { } OPTIONAL
}
-- TAG-HANDOVER-COMMAND-STOP
-- ASN1STOP
***** End message definition ***************************
```

Xn inter-node messages may be used for handover/DC setup. According to 3GPP TS 38.420, v15.2.0, there is a function called "Handover preparation function" that allows for the exchange of information between source and target NG-RAN nodes in order to initiate the handover of a certain UE to the target. An equivalent function exists for DC setup, called "S-NG-RAN-node Addition Preparation." It is also possible to cancel a prepared handover using the "Handover canceling function," which allows for informing an already prepared target NG-RAN node that a prepared handover will not take place. It allows for releasing the resources allocated during a preparation.

In 3GPP TS 38.423, v15.2.0, these functions are described in more detail. Relevant parts are described below. FIG. 4 shows Handover Preparation for a successful operation. The source NG-RAN node initiates the procedure by sending the HANDOVER REQUEST message to the target NG-RAN node, which responds with a HANDOVER REQUEST ACKNOWLEDGE, as seen in the figure. When the source NG-RAN node sends the HANDOVER REQUEST message, it shall start the timer TXnRELOCprep.

At reception of the HANDOVER REQUEST message, the target NG-RAN node shall prepare the configuration of the AS security relation between the UE and the target NG-RAN node by using the information in the UE Security Capabilities information element (IE) and the AS Security Information IE in the UE Context Information IE, as specified in 3GPP TS 33.501, v15.3.1.

FIG. 5 shows Handover Preparation for an unsuccessful operation. As was the case in FIG. 4, the process starts with the source NG-RAN sending a HANDOVER REQUEST message. If the target NG-RAN node does not admit at least one protocol data unit (PDU) session resource, or a failure occurs during the Handover Preparation, the target NG-RAN node shall send the HANDOVER PREPARATION FAILURE message to the source NG-RAN node. The message shall contain the Cause IE with an appropriate value.

Interactions with the Handover Cancel procedure will be discussed now. If there is no response from the target NG-RAN node to the HANDOVER REQUEST message before timer TXnRELOCprep expires in the source NG-RAN node, the source NG-RAN node should cancel the Handover Preparation procedure towards the target NG-RAN node by initiating the Handover Cancel procedure with the appropriate value for the Cause IE. The source NG-RAN node shall ignore any HANDOVER REQUEST ACKNOWLEDGE or HANDOVER PREPARATION FAILURE message received after the initiation of the Handover Cancel procedure and remove any reference and release any resources related to the concerned Xn UE-associated signaling.

There may be abnormal conditions. If the supported algorithms for encryption defined in the UE Security Capabilities IE in the UE Context Information IE, plus the mandated support of the EEA0 and NEA0 algorithms in all UEs, as defined in 3GPP TS 33.501, v15.3.1, do not match any allowed algorithms defined in the configured list of allowed encryption algorithms in the NG-RAN node, as also defined in 3GPP TS 33.501, v15.3.1, the NG-RAN node shall reject the procedure using the HANDOVER PREPARATION FAILURE message.

If the supported algorithms for integrity defined in the UE Security Capabilities IE in the UE Context Information IE, plus the mandated support of the MO and MAO algorithms in all UEs do not match any allowed algorithms defined in the configured list of allowed integrity protection algorithms in the NG-RAN node, the NG-RAN node shall reject the procedure using the HANDOVER PREPARATION FAILURE message.

FIG. 6 shows a Handover Cancel procedure for a successful operation. The Handover Cancel procedure is used to enable a source NG-RAN node to cancel an ongoing handover preparation or an already prepared handover. The procedure uses UE-associated signaling. The source NG- RAN node initiates the procedure by sending the HANDOVER CANCEL message to the target NG-RAN node. The source NG-RAN node shall indicate the reason for canceling the handover by means of an appropriate cause value. If the HANDOVER CANCEL message refers to a context that does not exist, the target NG-RAN node shall ignore the message.

The inter-node preparation procedures for handover were described above. Now, the inter-node procedures at mobility execution will be described. In particular, these are the inter-node steps that follow after a handover execution, i.e., upon the reception of the handover complete message at the target node (e.g., RRCReconfigurationComplete).

As described above, upon the reception of an RRCReconfigurationComplete the target node, a gNodeB in NR, or in more general terms a NG-RAN node as described in 3GPP 38.413, v15.2.0, triggers a Path Switch Request procedure by transmitting a PATH SWITCH REQUEST towards the Access and Mobility Management Function (AMF). The purpose of the Path Switch Request procedure is to request the switch of a downlink GTP tunnel towards a new GTP tunnel endpoint.

FIG. 7 shows a path switch request for a successful operation. The NG-RAN node initiates the procedure by sending the PATH SWITCH REQUEST message to the AMF. After all necessary updates including the user plane (UP) path switch have been successfully completed in the 5GC for at least one of the PDU session resources included in the PATH SWITCH REQUEST, the AMF shall send the PATH SWITCH REQUEST ACKNOWLEDGE message to the NG-RAN node and the procedure ends.

The list of accepted Quality-of-Service (QoS) flows shall be included in the PATH SWITCH REQUEST message within the Path Switch Request Transfer IE. The Session Management Function (SMF) shall handle this information as specified in 3GPP TS 23.502, v15.4.1. The list of PDU sessions which failed to be setup, if any, shall be included in the PATH SWITCH REQUEST message within the Path Switch Request Setup Failed Transfer IE. The AMF shall handle this information as specified in 3GPP TS 23.502.

For each PDU session for which the User Plane Security Information IE is included in the Path Switch Request Transfer IE of the PATH SWITCH REQUEST message, the SMF shall behave as specified in 3GPP TS 33.501, v15.3.1, and may send back the Security Indication IE within the Path Switch Request Acknowledge Transfer IE of the PATH SWITCH REQUEST ACKNOWLEDGE message.

If the Security Indication IE is included within the Path Switch Request Acknowledge Transfer IE of the PATH SWITCH REQUEST ACKNOWLEDGE message, the NG-RAN node shall behave as specified in 3GPP TS 33.501, v15.3.1. If the uplink (UL) NG-U UP TNL Information IE is included within the Path Switch Request Acknowledge Transfer IE of the PATH SWITCH REQUEST ACKNOWL-EDGE message, the NG-RAN node shall store this information and use it as the uplink termination point for the user plane data for this PDU session.

If the Core Network Assistance Information IE is included in the PATH SWITCH REQUEST ACKNOWLEDGE message, the NG-RAN node shall, if supported, store this information in the UE context and use it for, e.g., the RRC INACTIVE state decision and RNA configuration for the UE and RAN paging if any for a UE in RRC INACTIVE state, as specified in 3GPP TS 38.300, v15.4.0.

If the RRC Inactive Transition Report Request IE is included in the PATH SWITCH REQUEST ACKNOWL-EDGE message, the NG-RAN node shall, if supported, store this information in the UE context and: report to the AMF the RRC state of the UE when the UE enters or leaves RRC INACTIVE state in case the RRC Inactive Transition Report Request IE is set to "subsequent state transition report"; send one RRC INACTIVE TRANSITION REPORT message but no subsequent messages if the UE is in RRC_CONNECTED state and the RRC Inactive Transition Report Request IE is set to "single RRC connected state report"; send one RRC INACTIVE TRANSITION REPORT message plus one subsequent RRC INACTIVE TRANSITION REPORT message when the RRC state transitions to RRC_CONNECTED state if the UE is in RRC INACTIVE state and the RRC Inactive Transition Report Request IE is set to "single RRC connected state report"; or stop reporting to the AMF the RRC state of the UE in case the RRC Inactive Transition Report Request IE is set to "cancel report".

If the New Security Context Indicator IE is included in the PATH SWITCH REQUEST ACKNOWLEDGE message, the NG-RAN node shall use the information as specified in 3GPP TS 33.501, v15.3.1. Upon reception of the PATH SWITCH REQUEST ACKNOWLEDGE message the NG-RAN node shall store the received Security Context IE in the UE context and the NG-RAN node shall use it as specified in 3GPP TS 33.501, v15.3.1.

If the UE Security Capabilities IE is included in the PATH SWITCH REQUEST ACKNOWLEDGE message, the NG-RAN node shall handle it accordingly, as specified in 3GPP TS 33.501, v15.3.1. If the PDU Session Resource Released List IE is included in the PATH SWITCH REQUEST ACKNOWLEDGE message, the NG-RAN node shall release the corresponding QoS flows and regard the PDU session(s) indicated in the PDU Session Resource Released List IE as being released. The appropriate cause value for each PDU session released is included in the Path Switch Request Unsuccessful Transfer IE contained in the PATH SWITCH REQUEST ACKNOWLEDGE message.

Once the Path Switch Request procedure is completed, the target node triggers a UE context release procedure by transmitting a UE CONTEXT RELEASE message to the source NG-RAN node. That is shown below as described in 3GPP TS 38.423, v15.2.0, as being initiated by the target NG-RAN node to indicate to the source NG-RAN node that radio and control plane resources for the associated UE context are allowed to be released. The procedure uses UE-associated signaling. FIG. 8 illustrates a UE Context Release for successful operation for handover. The UE Context Release procedure is initiated by the target NG-RAN node. By sending the UE CONTEXT RELEASE message, the target NG-RAN node informs the source NG-RAN node of Handover success and triggers the release of resources.

If the UE Context Release procedure is not initiated towards the source NG-RAN node from any prepared NG-RAN node before the expiry of the timer TXnRELOCoverall, the source NG-RAN node shall request the AMF to release the UE context. If the UE returns to source NG-RAN node before the reception of the UE CONTEXT RELEASE message or the expiry of the timer TXnRELOCoverall, the source NG-RAN node shall stop the TXnRELOCoverall and continue to serve the UE.

SUMMARY

When a potential target node is requested to allocate resources for a conditional handover (or other conditional mobility procedure) of a UE to a potential target cell (including CFRA preamble and future transmission resources for the UE's bearers), it performs admission control. Admission control typically involves probability assessment, e.g., in terms of what the result would be if statistical multiplexing were used between the bearers of connected UEs. This may be an uncertain calculation, especially when conditional handover is introduced, since then the assessment involves UE bearers which may or may not be established in the potential target cell sometime in the (not too distant) future.

When conditional handover is introduced, another element of probability assessment comes into play in the admission control decision, which may be leveraged to enable the potential target node to more generously allocate resources to UEs being subject to conditional handovers without increasing the statistical risk of overallocation. This element is due to the relatively long time a conditional handover procedure may be ongoing (compared to a regular handover). As a consequence of this delay, there may be several conditional mobility procedures ongoing at the same time, with the same cell as a potential target cell. The fact that not all of the ongoing conditional mobility procedures will result in a UE actually connecting to the potential target cell (potentially a significant fraction of them will never be executed or will be executed with another cell as the target cell) allows the application of statistical multiplexing on the simultaneously ongoing conditional mobility procedures and between conditional mobility procedures and already established connections to other UEs in a concerned potential target cell, based on the assumption that statistically not all of the conditional mobility procedures will be executed with the concerned potential target cell as the target cell.

However, such statistical multiplexing depends on a number of uncertain probability assessments, such as the amount of traffic and the distribution of the traffic generated on the different existing and potential bearers, as well as the probability that a UE configured for a conditional mobility procedure to a certain cell will actually connect to that cell. In order not to cause overload in the cell and risk not being able to satisfy all QoS commitments, these uncertainties force the potential target node to apply a safety margin in the probability assessments and the consequent statistical multiplexing assumptions and eventually in the admission control decision/policy.

Hence, any improvement in the accuracy of the probability assessment would allow the potential target node to perform more accurate statistical multiplexing assumptions and eventually a more accurate admission control. Furthermore, this in turn would allow the potential target node to apply a smaller safety margin and thus be more generous in the admission control. Hence, the potential target node would be more inclined to accept a requested preparation for a conditional mobility procedure.

A way to improve the accuracy of the probability assessment is to have the source node (e.g. the source gNB in NR or the source eNB in LTE), when requesting a potential target node to prepare for a conditional mobility procedure with one of the potential target node's cells as the potential target node, indicate the probability that the conditional mobility procedure will be executed and result in a connection in the concerned potential target cell.

If a probability that has been indicated to a potential target node changes (e.g., because potential target cells are added or removed, or if a measurement report from the UE indicates that the distance to the CHO trigger condition has changed, perhaps significantly), the source node has the option to update the affected potential target node.

According to some embodiments of the techniques disclosed herein, a source node determines that a UE served by the source node is a candidate for conditional handover configuration. The network node sends, to a target node for conditional handover of the UE, a conditional handover request that includes one or more parameters indicative of a likelihood that handover of the UE to the target node will be executed. These one or more parameters may comprise a probability value, for example. The target node receives the request and parameters allocates resources for the UE, taking into account the likelihood that handover of the first UE to the target node will be executed. The target node sends handover configuration information for the first UE to the source node, in response to the conditional handover request.

According to some embodiments, a method, in a source node operating in a wireless communication network, includes determining that a UE served by the source node is a candidate for conditional handover configuration. The method also includes sending, to a target node for conditional handover of the UE, a conditional handover request that includes one or more parameters indicative of a likelihood that handover of the UE to the target node will be executed.

According to some embodiments, a method, in target node operating in a wireless communication network, includes receiving, from a source node serving a first UE, a conditional handover request that includes one or more parameters indicative of a likelihood that handover of the first UE to the target node will be executed. The method includes allocating resources for the UE, where the allocating takes into account the likelihood that handover of the first UE to the target node will be executed. The method further includes sending handover configuration information for the first UE to the source node, in response to the conditional handover request.

Embodiments of the present invention enable a potential target node to have a better basis on which to decide whether to accept a requested preparation. This may involve transmission resources for a conditional handover/mobility procedure, including transmission resources for the concerned UE's bearers and a possible contention-free based random access (CFRA) preamble. With better input information to the admission control, the potential target node can have a more generous admission control policy, since more uncertain situations call for more conservative admission control policies.

Further aspects of the present invention are directed to an apparatus, network node, base station, wireless device, UE, network devices, computer program products or computer readable storage medium corresponding to the methods summarized above and functional implementations of the above-summarized network node and wireless device.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIGS. 15 to 18 are flowcharts illustrating example methods implemented in a communication system including a host computer, a base station and a user equipment.

DETAILED DESCRIPTION

Figure 1:
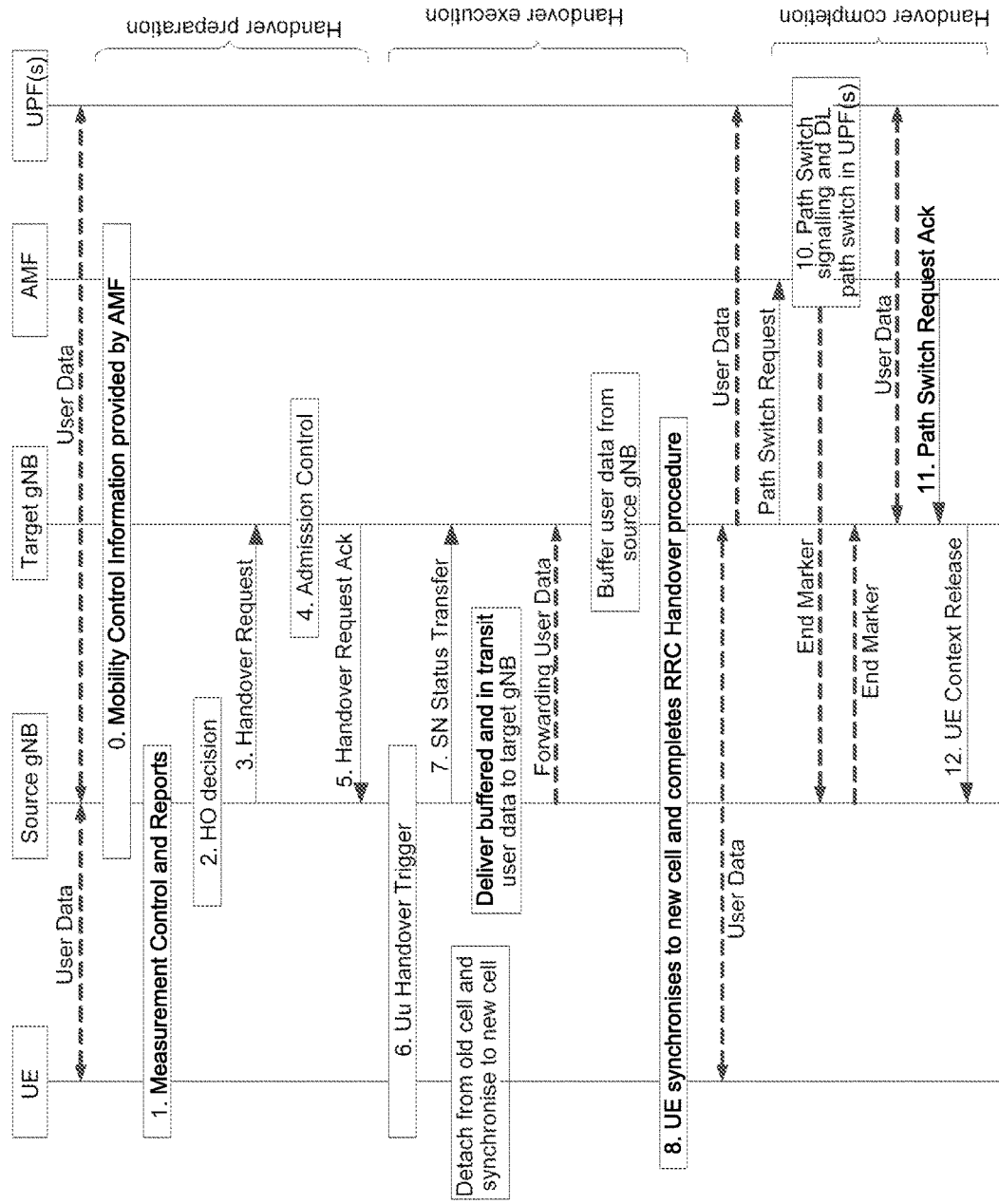
FIG. 1 illustrates a signaling flow for a handover procedure.
Figure 2:
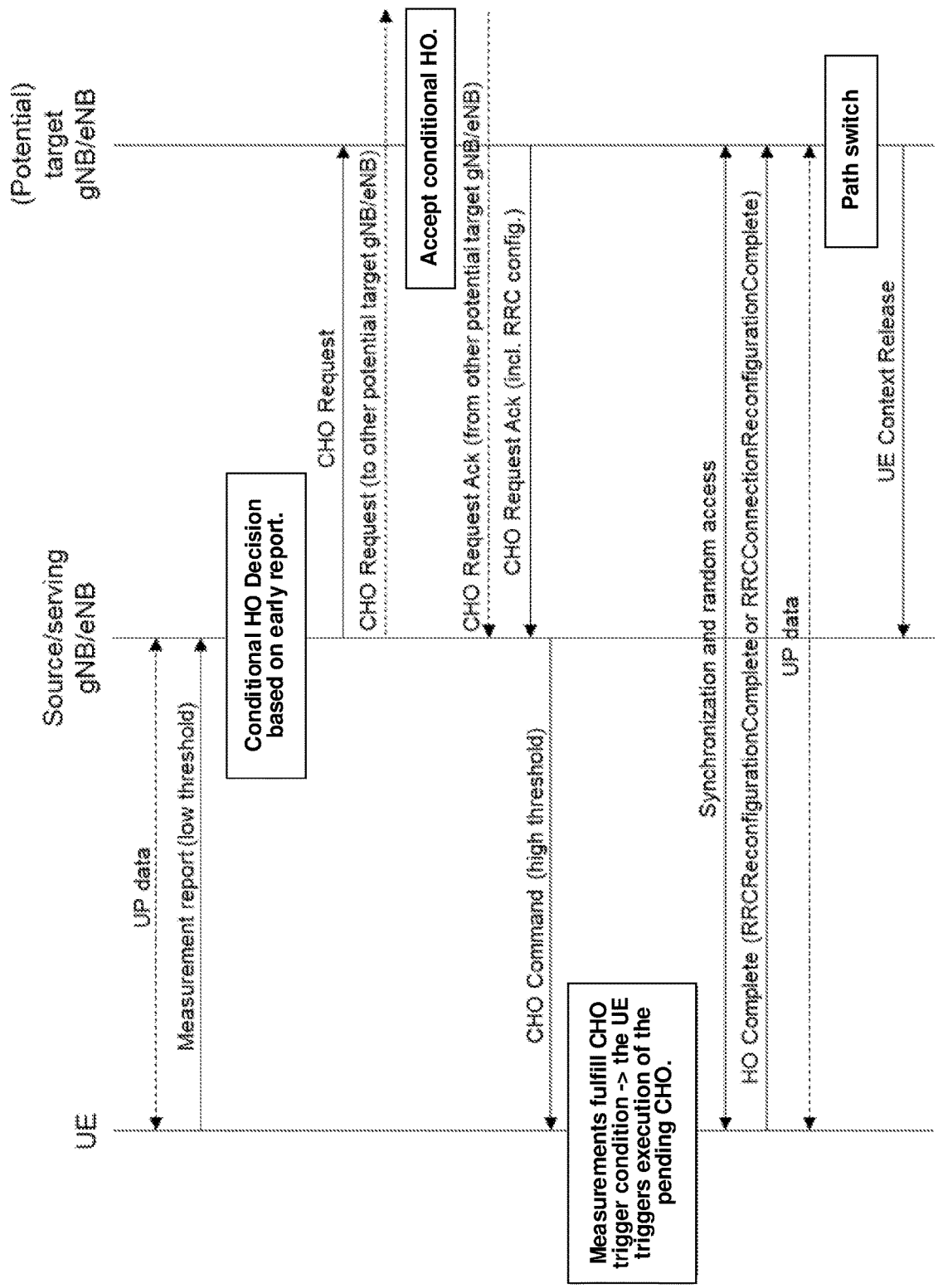
FIG. 2 illustrates a signaling flow for a conditional handover procedure.
Figure 3:
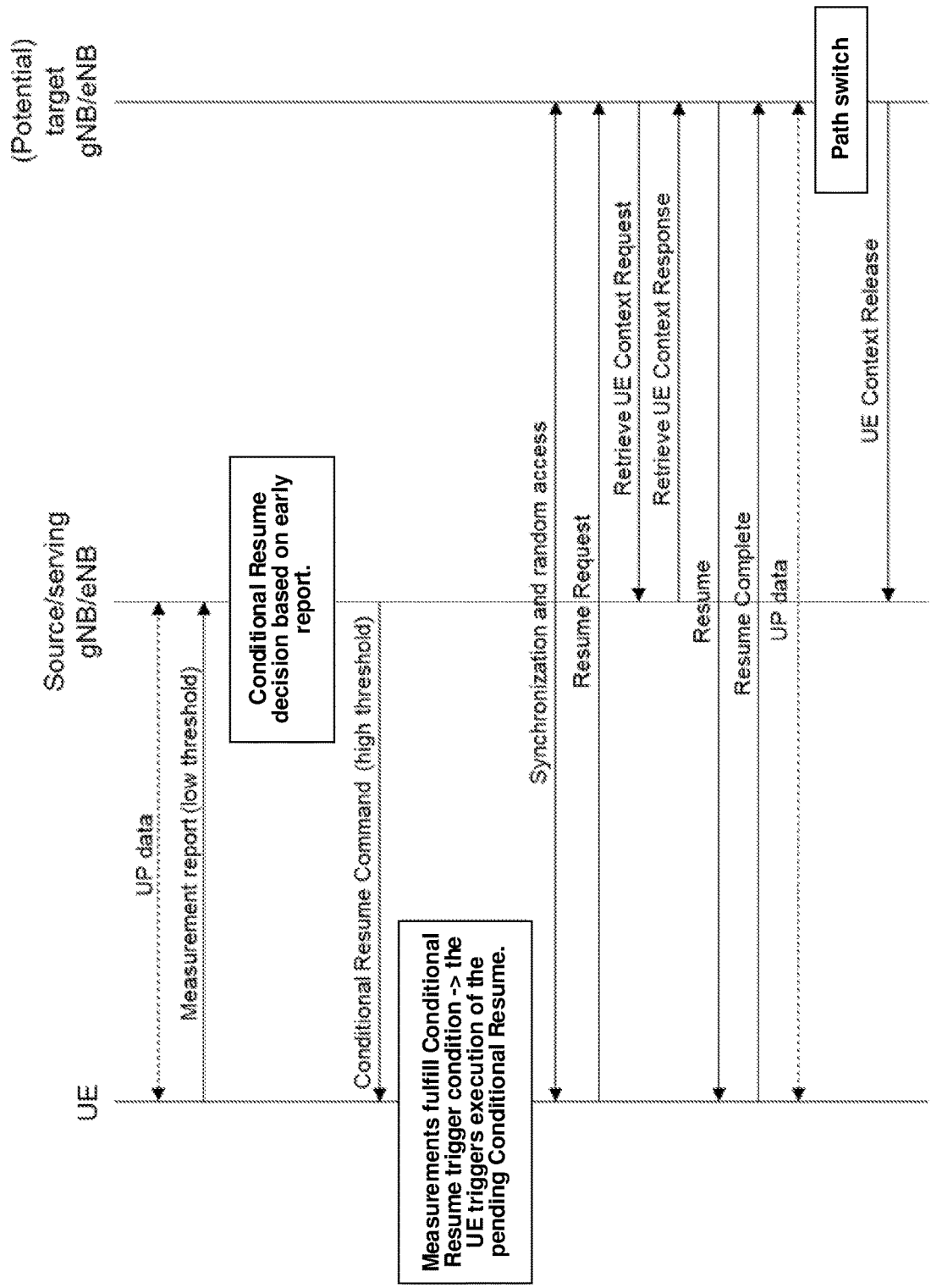
FIG. 3 illustrate a signaling flow for a conditional resume procedure.
Figure 4:
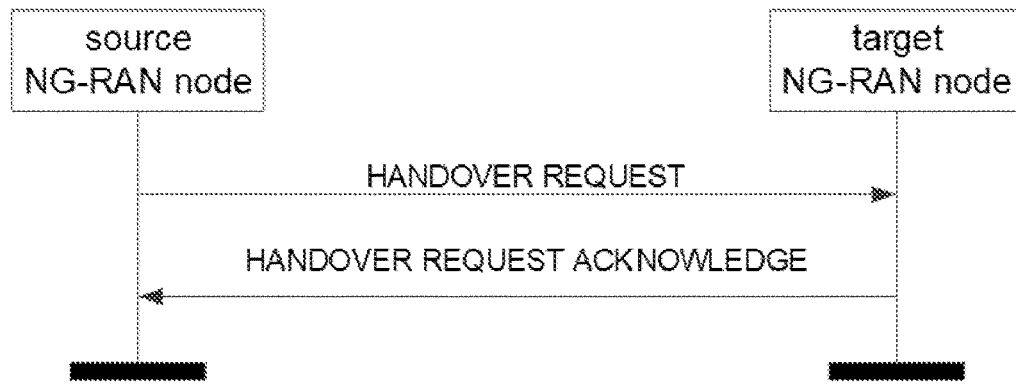
FIG. 4 illustrates handover preparation for a successful operation.
Figure 5:
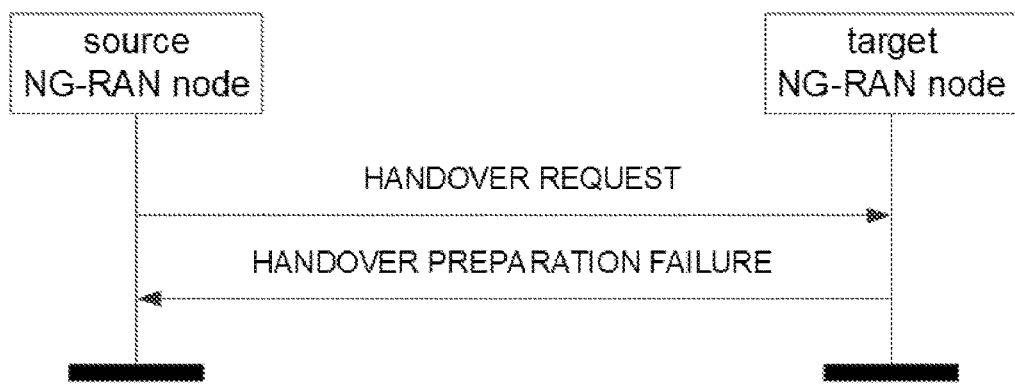
FIG. 5 illustrates handover preparation for an unsuccessful operation.
Figure 6:
FIG. 6 illustrates a handover cancel for a successful operation.
Figure 7:
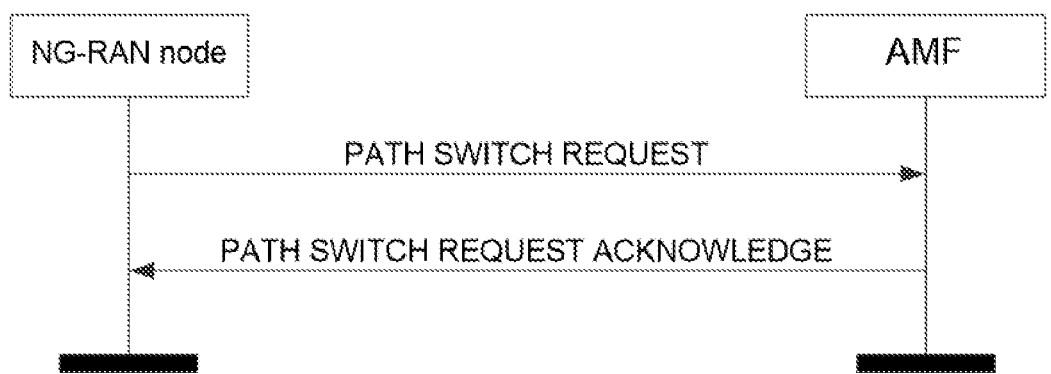
FIG. 7 illustrates illustrate a path switch request for a successful operation.
Figure 8:
FIG. 8 illustrates a UE context release for a successful operation for handover.

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. Any two or more embodiments described in this document may be combined with each other. The embodiments are described with respect to LTE, including LTE-M, but can be adapted in other radio access technologies (RATs) where the techniques or selections may be relevant.

In the present discussion, the term "source node" refers to a network node, such as a gNB or eNB, that is initially serving the UE in question. In describing the operation of such a node, the node might be referred to as a "first node." The term "target node" refers to a corresponding network node that is a target for a handover or conditional handover and might alternatively be referred to as a "potential target node" or a "second node." A given network node, e.g., a gNB or eNB, might act as a source node for one or more UEs while also acting as a target node or potential target node for one or more others.

Embodiments described herein enable a source node in a conditional mobility procedure, when requesting a potential target node to prepare (e.g., allocate resources) for the conditional mobility procedure, for each of the cells of the potential target node that is a potential target cell, and to provide the potential target node with an indication of the probability that the mobility procedure is eventually executed with the potential target cell as the target cell. As described above in the "Summary" section, this may be done by including, in the conditional handover request, one or more parameters indicative of a likelihood that handover of the UE to the target node will be executed. Note that the terms "likelihood" and "probability" are used interchangeably herein.

The potential target node uses the probability indication (i.e., the one or more parameters indicative of a likelihood that handover of the UE to the target node will be executed) to improve its probability assessments and thereon based statistical multiplexing. In the end, this results in a smaller safety margin allowing for a more generous admission control policy.

The probability indication may include or be based on aspects such as the number of configured potential target cells or the distance/amount left to fulfillment of the conditional handover (CHO) trigger condition. The fulfillment of this condition may trigger the UE to execute the mobility procedure. The probability indication may include the actual CHO trigger condition. The probability indication may also include or be based on movement speed of the UE, doppler spread, timing advance changes, information from the UE, etc. The probability indication may be based on previous experience from similar situations in the same cell with the same or similar set of potential target nodes and/or similar CHO trigger condition (and similar distance/amount left to fulfillment of the CHO trigger condition). If a probability that the source node has indicated to a potential target node changes, the source node may optionally update the affected potential target node.

As noted above, when a potential target node is requested to allocate resources for a conditional handover (or other conditional mobility procedure) of a UE to a potential target cell (including CFRA preamble and future transmission resources for the UE's bearers), it performs admission control. Admission control typically involves probability assessment, e.g., in terms of what the result would be if statistical multiplexing were used between the bearers of connected UEs. This may be an uncertain calculation, especially so when conditional handover is introduced, since then the assessment involves UE bearers which may or may not be established in the potential target cell sometime in the (not too distant) future.

When conditional handover is introduced, another element of probability assessment comes into play in the admission control decision, which may be leveraged to enable the potential target node to more generously allocate resources to UEs being subject to conditional handovers without increasing the statistical risk of overallocation. This element is due to the relatively long time a conditional handover procedure may be ongoing (compared to a regular handover). As a consequence, there may be several conditional mobility procedures ongoing at the same time with the same cell as a potential target cell. Not all of the ongoing conditional mobility procedures will result in a UE connection in the potential target cell (potentially a significant fraction of them will never be executed or will be executed with another cell as the target cell). This allows for the applying of statistical multiplexing on the simultaneously ongoing conditional mobility procedures and between conditional mobility procedures and already established connections to other UEs in a concerned potential target cell. This may be based on the assumption that statistically not all of the conditional mobility procedures will be executed with the concerned potential target cell as the target cell.

However, such statistical multiplexing depends on a number of uncertain probability assessments, such as the amount of traffic and the distribution of the traffic generated on the different existing and potential bearers, as well as the probability that a UE configured for a conditional mobility procedure to a certain cell will actually connect to that cell. In order not to cause overload in the cell and risk not being able to satisfy all Quality of Service (QoS) commitments, these uncertainties force the potential target node to apply a safety margin in the probability assessments and the consequent statistical multiplexing assumptions and eventually in the admission control decision/policy.

Therefore, any improvement in the accuracy of the probability assessment would allow the potential target node to perform more accurate statistical multiplexing assumptions and eventually a more accurate admission control. Furthermore, this in turn would allow the potential target node to apply a smaller safety margin and thus be more generous in the admission control. Hence, the potential target node would be more inclined to accept a requested preparation for a conditional mobility procedure.

A way to improve the accuracy of the probability assessment is to have the source node (e.g., the source gNB in NR or the source eNB in LTE), when requesting a potential target node to prepare for a conditional mobility procedure with one of the potential target node's cells as the potential target node, indicate the probability/likelihood that the conditional mobility procedure will be executed and result in a connection in the concerned potential target cell.

Such a probability indication could come in different forms, such as a probability value in the range 0-1, for example, or in the range 0-100. The source node may base this value on the number of configured potential target cells, and/or on the number of potential target cells that the source node plans to configure. The value may be based on the distance or amount left to fulfillment of the CHO trigger condition, i.e., the condition whose fulfillment would trigger the UE to execute the mobility procedure) The value may be dB or dBm left to a channel quality threshold (absolute or relative) in terms of, for example, RSRP, RSRQ, RSSI, SINR or SNR. The value may be based on movement speed of the UE, the distance/amount left to fulfillment of the CHO trigger condition and the other conditions described above.

If a probability that has been indicated to a potential target node changes, e.g., because potential target cells are added or removed, or if a measurement report from the UE indicates that the distance to the CHO trigger condition has changed, perhaps significantly, the source node has the option to update the affected potential target node with a new inter-node message or messages, such as a new XnAP message across the Xn interface in NR or a new X2AP message, across the X2 interface in case of LTE, or new NGAP messages via the NG interface and the AMF in case there is no Xn interface to the potential target node in NR, or new S1AP messages via the S1 interface and the MME in case there is no X2 interface to the potential target node in LTE.

If the update is that the probability has decreased, this may cause the potential target node to be more generous in accepting subsequent conditional mobility procedure preparation requests and connection requests.

If the update is that the probability has increased, this may cause the potential target node to be more restrictive in accepting subsequent conditional mobility procedure preparation requests and connection requests. Another optional alternative for the potential target node could be that it changes its decision and revoke its acceptance of the concerned conditional mobility preparation, i.e., the one for which the probability of execution has increased. If the latter is the case, then the UE should also preferably be updated to remove the conditional mobility configuration for the concerned potential target cell. This would require additional source node-UE signaling, such as RRC signaling, which increases the overhead and may be uncertain because the channel quality towards the UE may have deteriorated to a poor level. To avoid this additional overhead and complexity, it may be preferable to mandate that the potential target node has to stick to its commitment, despite the increased probability.

In addition to adapting its admission control strategy/policy, e.g., in terms of margins and/or thresholds, a potential target node may use the probability indication pertaining to a potential target cell to adapt a validity timer associated with the positive admission control, including allocated resources, such as a CFRA preamble, as well as the RRC configuration the UE should apply in case of handover to the potential target cell. Such a validity timer, whose expiration implies that the concerned UE is no longer welcome to execute the handover to the potential target cell, has been proposed in 3GPP. Adaptation of such a validity timer could, for example, be that high probability of handover execution to a potential target cell would lead to configuration of a validity timer with longer time until expiration.

Figure 9:
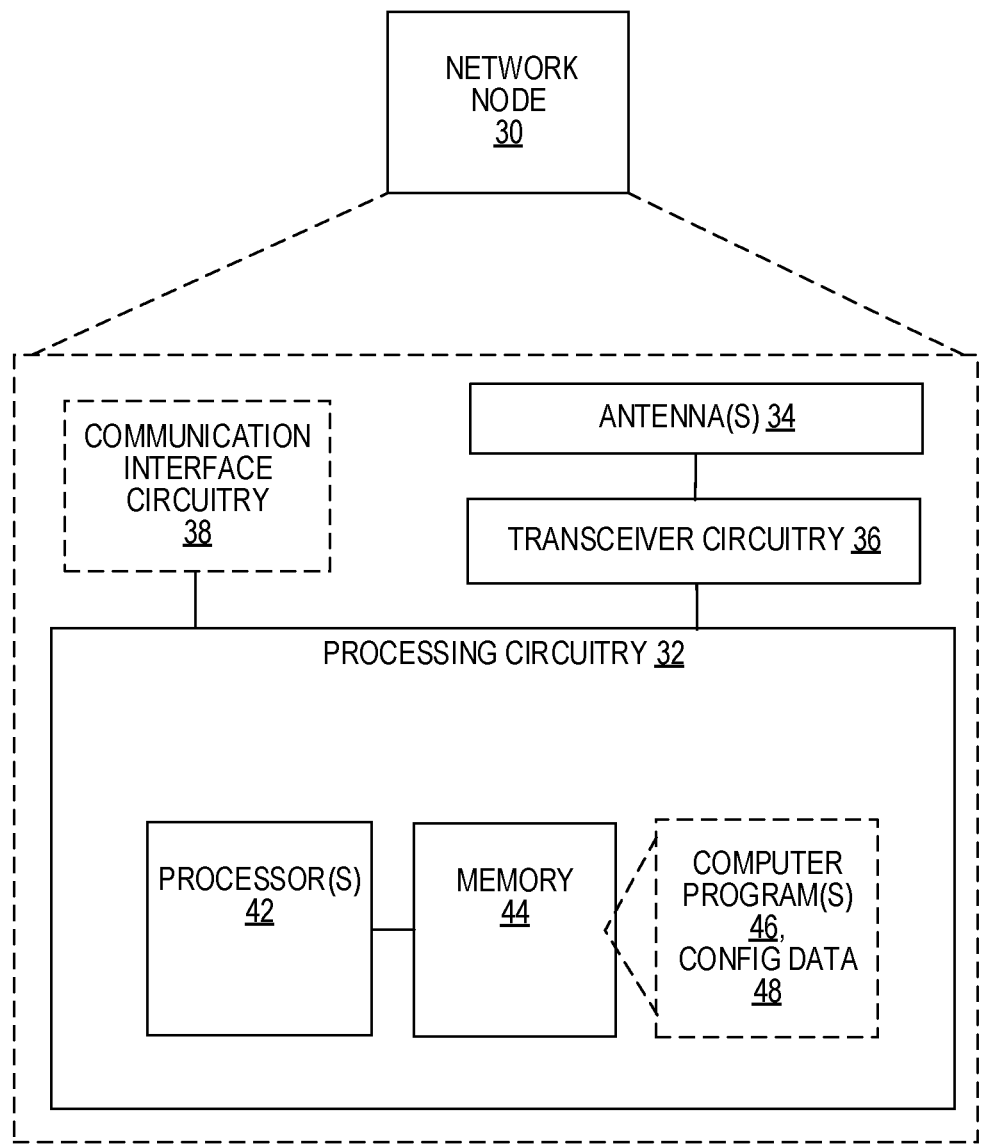
FIG. 9 illustrates a block diagram of a network node, according to some embodiments.

FIG. 9 shows an example network node 30 that may be configured to facilitate conditional handover according to one or more of these disclosed techniques. Network node 30 may be an evolved Node B (eNodeB), Node B or gNB. While a network node 30 taking the form of an eNodeB or gNB is shown in FIG. 9, the operations can be performed by other kinds of network access nodes, including a radio network node such as base station, radio base station, base transceiver station, base station controller, network controller, NR BS, Multi-cell/multicast Coordination Entity (MCE), relay node, access point, radio access point, Remote Radio Unit (RRU) Remote Radio Head (RRH), or a multi-standard BS (MSR BS).

In the non-limiting embodiments described below, network node 30 will be described as being configured to operate as a source node and/or a target node in the LTE network or NR network. In some embodiments, the technique can be implemented in the RRC layer. Some or all of the RRC layer could be implemented by one or more network nodes in a cloud environment, and hence some embodiments can be implemented in a cloud environment.

Those skilled in the art will readily appreciate how each type of node may be adapted to carry out one or more of the methods and signaling processes described herein, e.g., through the modification of and/or addition of appropriate program instructions for execution by processing circuits 32.

Network node 30 facilitates communication between wireless terminals (e.g., UEs), other network access nodes, and/or the core network. Network node 30 may include communication interface circuitry 38 that includes circuitry for communicating with other nodes in the core network, radio nodes, and/or other types of nodes in the network for the purposes of providing data and/or cellular communication services. Network node 30 communicates with wireless devices using antennas 34 and transceiver circuitry 36.

Transceiver circuitry 36 may include transmitter circuits, receiver circuits, and associated control circuits that are collectively configured to transmit and receive signals according to a radio access technology, for the purposes of providing cellular communication services.

Network node 30 also includes one or more processing circuits 32 that are operatively associated with the transceiver circuitry 36 and, in some cases, the communication interface circuitry 38. Processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, memory 44 comprises any one or more of SRAM, DRAM, EEPROM, and FLASH memory, which may be in processing circuitry 32 and/or separate from processing circuitry 32. Memory 44 may also store any configuration data 48 used by the network access node 30. Processing circuitry 32 may be configured, e.g., through the use of appropriate program code stored in memory 44, to carry out one or more of the methods and/or signaling processes detailed hereinafter.

Processing circuitry 32 of network node 30 is configured, according to some embodiments, to be a node that acts as a source node. Processing circuitry 32 is configured to determine that a UE served by the source node is a candidate for conditional handover configuration and send, to a target node for conditional handover of the UE, a conditional handover request that includes one or more parameters indicative of a likelihood that handover of the UE to the target node will be executed.

Figure 10:
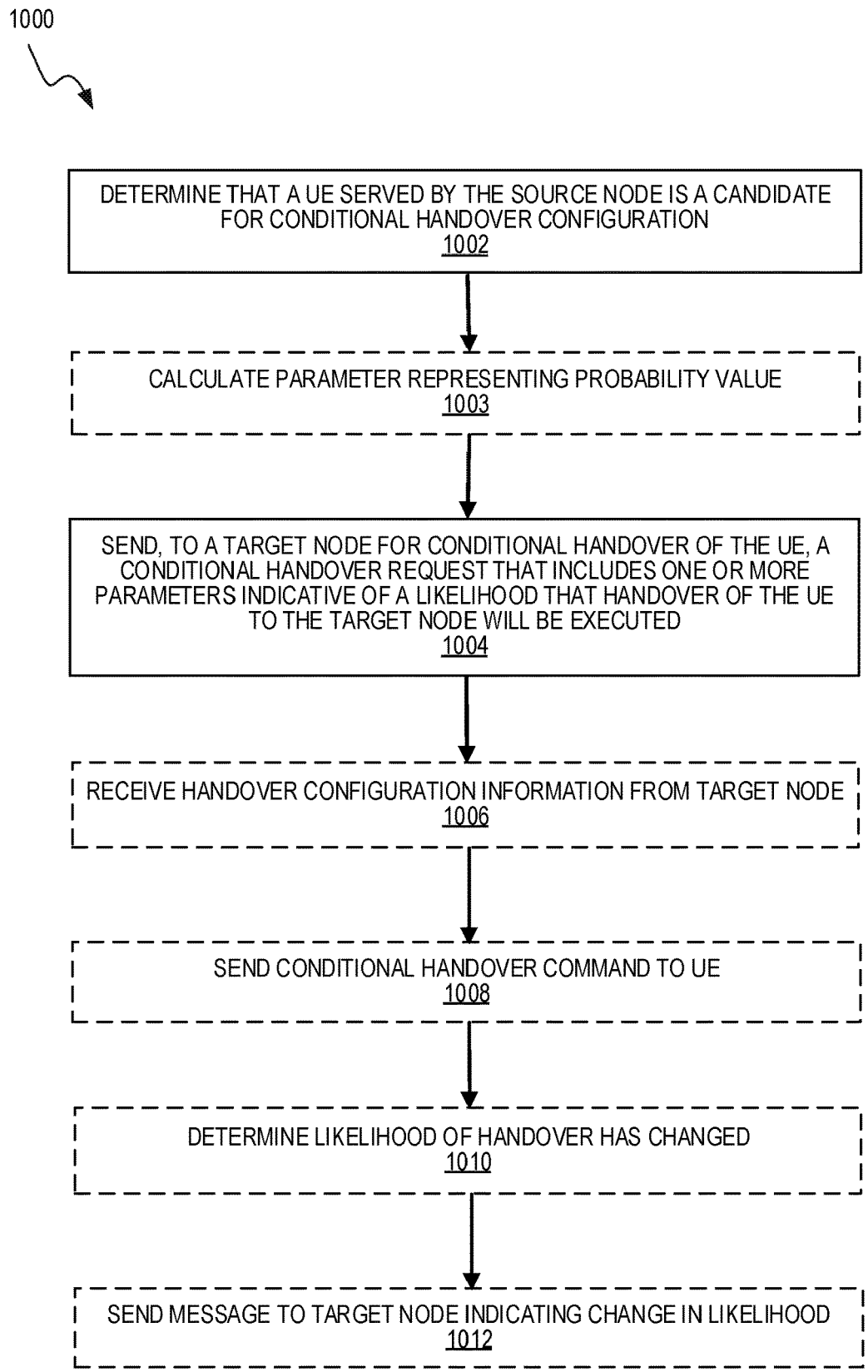
FIG. 10 illustrates a flowchart illustrating a method in a source network node, according to some embodiments.

Processing circuitry 32 may also be configured to perform a corresponding method 1000, shown in FIG. 10. Method 1000 includes receiving, from determining that a UE served by the source node is a candidate for conditional handover configuration (block 1002). Method 1000 also includes sending, to a target node for conditional handover of the UE, a conditional handover request that includes one or more parameters indicative of a likelihood that handover of the UE to the target node will be executed (block 1004). In some embodiments, determining that the UE is a candidate for conditional handover configuration is based on measurement reports received from the UE.

Method 1000 may further include receiving handover configuration information from the target node (block 1006), in response to the conditional handover request, and sending a conditional handover command to the UE (block 1008).

The conditional handover command may include the handover configuration information and one or more parameters defining a trigger condition for execution of handover to the target node. The parameters may be indicative of the likelihood that handover of the UE to the target node will be executed include a parameter representing a probability value. In this variation, the source node may calculate the probability value from any of a variety of factors (block 1003). Method 1000 may further include calculating the parameter representing the probability value based on any one or more of the following: a number of potential target cells for conditional handover of the UE; a difference between radio link conditions for executing conditional handover and reported radio link conditions for the UE; a speed or velocity of the UE; a doppler spread corresponding to the UE; a trigger condition for execution of handover to the target node; and historical data for conditional handovers of UEs served by the source node.

In the variation above, the source node may calculate the probability value from any of a variety of factors. In this variation, the source node can instead just send various values from which the target node can infer a probability. For example, the parameters indicative of the likelihood that handover of the UE to the target node will be executed may include any one or more of the following: a parameter representing a probability value; a parameter representing a number of potential target cells for conditional handover of the UE; a parameter representing a difference between radio link conditions for executing conditional handover and reported radio link conditions for the UE; a parameter representing a speed or velocity of the UE; and a parameter representing a trigger condition for execution of handover to the target node.

Method 1000 may further include determining (block 1010), after sending the conditional handover request to the target node, that the likelihood that handover of the UE to the target node will be executed has changed, and sending (block 1012), to the target node, a message indicating the change in likelihood.

While method 1000 refers only to a single target node, this does not preclude the possibility that the CHO command has configuration/trigger information for multiple target nodes.

In other embodiments, network node 30 may be configured to be a node that acts as a target node. In this case, processing circuitry 32 is configured to receive, from a source node serving a first UE, a conditional handover request that includes one or more parameters indicative of a likelihood that handover of the first UE to the target node will be executed. Processing circuitry 32 is also configured to allocate resources for the UE, taking into account the likelihood that handover of the first UE to the target node will be executed. Processing circuitry 32 is configured to send handover configuration information for the first UE to the source node, in response to the conditional handover request.

Figure 11:
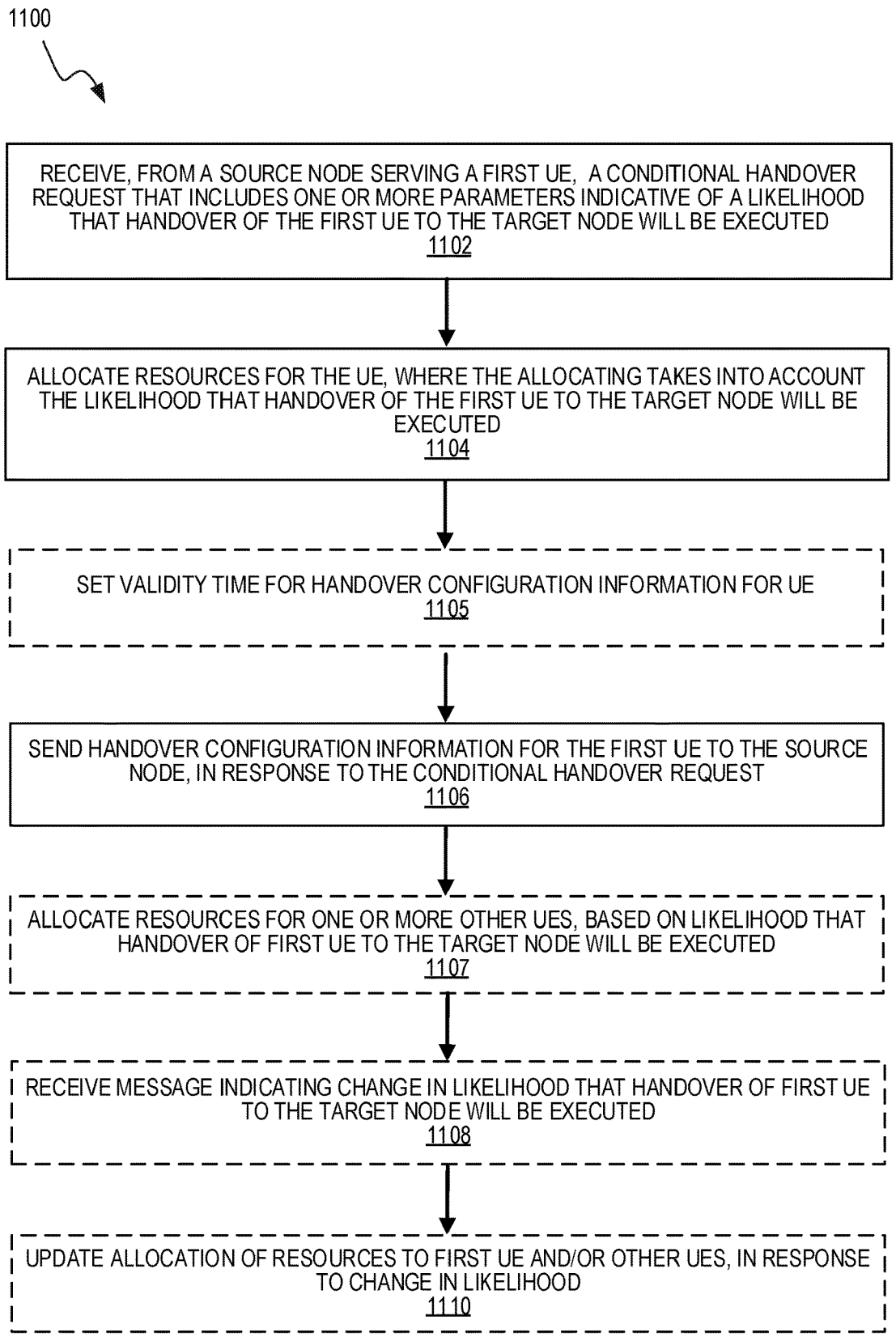
FIG. 11 illustrates is a flowchart illustrating a method in a target network node, according to some embodiments.

Processing circuitry 32 is also configured to perform a corresponding method 1100 shown in FIG. 11. Method 1100 includes receiving, from a source node serving a first UE, a conditional handover request that includes one or more parameters indicative of a likelihood that handover of the first UE to the target node will be executed (block 1102). Method 1100 also includes allocating resources for the UE, where the allocating takes into account the likelihood that handover of the first UE to the target node will be executed (block 1104). Method 1100 further includes sending handover configuration information for the first UE to the source node, in response to the conditional handover request (block 1106). Note that the allocation of resources in block 1104 might include such things as CFRA selection and even the initial decision to admit the UE, so this step may take place before sending the CHO Request Ack or, at least partly, after sending the CHO Request Ack. In other words, the allocating step at block 1104 may take place at different times or the steps may be in a different order.

Allocating resources for the first UE may include performing an admission control decision, taking into account the likelihood that handover of the first UE to the target node will be executed and selecting a random access configuration to be allocated to the first UE for accessing the target node. Method 1100 may further include allocating resources for one or more other UEs (block 1107), taking into account the likelihood that handover of the first UE to the target node will be executed. This probability can affect admission control/resource allocation for other UEs as well.

In some embodiments, the parameters indicative of the likelihood that handover of the first UE to the target node will be executed include a parameter representing a probability value, and the allocating of resources for the first UE is based on the parameter representing the probability value. The parameters indicative of the likelihood that handover of the first UE to the target node will be executed may include and the allocating of resources for the first UE may be based on any one or more of the following: a parameter representing a probability value; a parameter representing a number of potential target cells for conditional handover of the first UE; a parameter representing a difference between radio link conditions for executing conditional handover and reported radio link conditions for the first UE; a parameter representing a speed or velocity of the first UE; and a parameter representing a trigger condition for execution of handover to the target node.

Method 1100 may further include setting a validity time for the handover configuration information for the UE (block 1105), based on the likelihood that handover of the UE to the target node will be executed.

Method 1100 may include receiving, after sending the handover configuration information to the source node, a message indicating a change in likelihood that handover of the UE to the target node will be executed (block 1108), and updating an allocation of resources to the first UE, in response to the change in likelihood (block 1110). Similarly, method 1100 may include receiving, after sending the handover configuration information to the source node, a message indicating a change in likelihood that handover of the UE to the target node will be executed (block 1108), and allocating resources or updating allocations of resources for one or more other UEs, taking into account the change in likelihood (block 1110).

Figure 12:
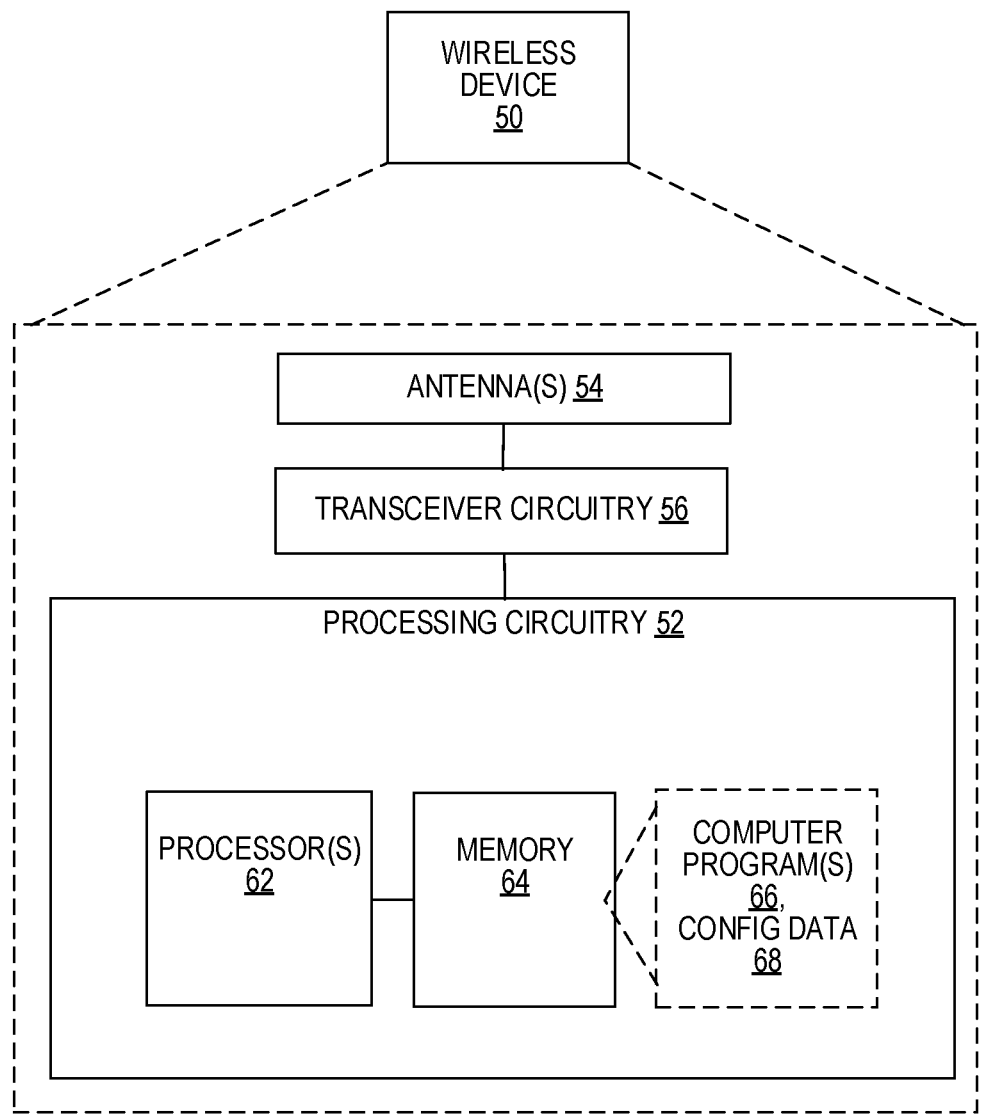
FIG. 12 illustrates is a block diagram of a wireless device, according to some embodiments.

FIG. 12 illustrates a wireless device 50 configured to perform any actions to support and/or utilize the techniques described above for network node 30, according to some embodiments. Wireless device 50 may be considered to represent any wireless devices or terminals that may operate in a network, such as a UE in a cellular network as in the techniques described above. Other examples may include a communication device, target device, MTC device, IoT device, device to device (D2D) UE, machine type UE or UE capable of machine to machine communication (M2M), a sensor equipped with UE, PDA (personal digital assistant), tablet, IPAD tablet, mobile terminal, smart phone, laptop embedded equipped (LEE), laptop mounted equipment (LME), USB dongles, Customer Premises Equipment (CPE), etc.

Wireless device 50 is configured to communicate with a network node or base station in a wide-area cellular network via antennas 54 and transceiver circuitry 56. Transceiver circuitry 56 may include transmitter circuits, receiver circuits, and associated control circuits that are collectively configured to transmit and receive signals according to a radio access technology, for the purposes of using cellular communication services.

Wireless device 50 also includes one or more processing circuits 52 that are operatively associated with the radio transceiver circuitry 56. Processing circuitry 52 comprises one or more processors 62, e.g., digital processing circuits that include one or more microprocessors, microcontrollers, DSPs, FPGAs, CPLDs, ASICs, or any mix thereof. More generally, processing circuitry 52 may comprise fixed circuitry, or programmable circuitry that is specially adapted via the execution of program instructions implementing the functionality taught herein or may comprise some mix of fixed and programmed circuitry. Processing circuitry 52 may be multi-core.

Processing circuitry 52 also includes a memory 64. Memory 64, in some embodiments, stores one or more computer programs 66 and, optionally, configuration data 68. Memory 64 provides non-transitory storage for computer program 66 and it may comprise one or more types of computer-readable media, such as disk storage, solid-state memory storage, or any mix thereof. By way of non-limiting example, memory 64 comprises any one or more of SRAM, DRAM, EEPROM, and FLASH memory, which may be in processing circuitry 52 and/or separate from processing circuitry 52. Memory 64 may also store any configuration data 68 used by wireless device 50. Processing circuitry 52 may be configured, e.g., through the use of appropriate program code stored in memory 64, to carry out one or more of the methods and/or signaling processes detailed hereinafter. Processing circuitry 52 of wireless device 50 is configured, according to some embodiments, to support and/or utilize the operations of network node 30 described above.

Figure 13:
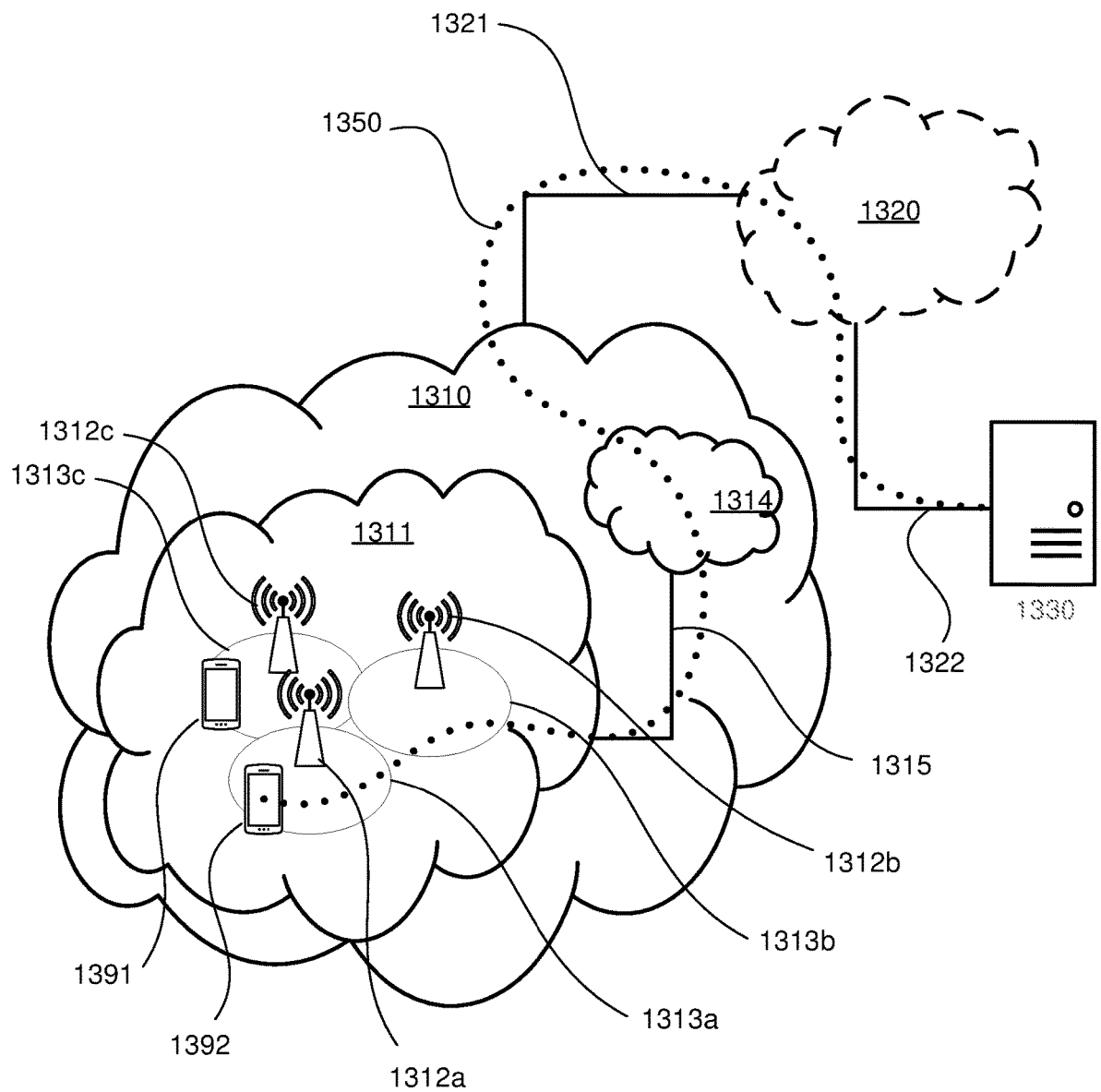
FIG. 13 schematically illustrates a telecommunication network connected via an intermediate network to a host computer, according to some embodiments.

FIG. 13, according to some embodiments, illustrates a communication system that includes a telecommunication network 1310, such as a 3GPP-type cellular network, which comprises an access network 1311, such as a radio access network, and a core network 1314. The access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to the core network 1314 over a wired or wireless connection 1315. A first UE 13131 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

The telecommunication network 1310 is itself connected to a host computer 1330, which may be embodied in the hardware and/or software of a standalone server, a cloud-implemented server, a distributed server or as processing resources in a server farm. The host computer 1330 may be under the ownership or control of a service provider or may be operated by the service provider or on behalf of the service provider. The connections 1321, 1322 between the telecommunication network 1310 and the host computer 1330 may extend directly from the core network 1314 to the host computer 1330 or may go via an optional intermediate network 1320. The intermediate network 1320 may be one of, or a combination of more than one of, a public, private or hosted network; the intermediate network 1320, if any, may be a backbone network or the Internet; in particular, the intermediate network 1320 may comprise two or more sub-networks (not shown).

The communication system of FIG. 13 as a whole enables connectivity between one of the connected UEs 1391, 1392 and the host computer 1330. The connectivity may be described as an over-the-top (OTT) connection 1350. The host computer 1330 and the connected UEs 1391, 1392 are configured to communicate data and/or signaling via the OTT connection 1350, using the access network 1311, the core network 1314, any intermediate network 1320 and possible further infrastructure (not shown) as intermediaries. The OTT connection 1350 may be transparent in the sense that the participating communication devices through which the OTT connection 1350 passes are unaware of routing of uplink and downlink communications. For example, a base station 1312 may not or need not be informed about the past routing of an incoming downlink communication with data originating from a host computer 1330 to be forwarded (e.g., handed over) to a connected UE 1391. Similarly, the base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In a communication system 1400, a host computer 1410 comprises hardware 1415 including a communication interface 1416 configured to set up and maintain a wired or wireless connection with an interface of a different communication device of the communication system 1400. The host computer 1410 further comprises processing circuitry 1418, which may have storage and/or processing capabilities. In particular, the processing circuitry 1418 may comprise one or more programmable processors, application-specific integrated circuits, field programmable gate arrays or combinations of these (not shown) adapted to execute instructions. The host computer 1410 further comprises software 1411, which is stored in or accessible by the host computer 1410 and executable by the processing circuitry 1418. The software 1411 includes a host application 1412. The host application 1412 may be operable to provide a service to a remote user, such as a UE 1430 connecting via an OTT connection 1450 terminating at the UE 1430 and the host computer 1410. In providing the service to the remote user, the host application 1412 may provide user data which is transmitted using the OTT connection 1450.

The communication system 1400 further includes a base station 1420 provided in a telecommunication system and comprising hardware 1425 enabling it to communicate with the host computer 1410 and with the UE 1430. The hardware 1425 may include a communication interface 1426 for setting up and maintaining a wired or wireless connection with an interface of a different communication device of the communication system 1400, as well as a radio interface 1427 for setting up and maintaining at least a wireless connection 1470 with a UE 1430 located in a coverage area (not shown in FIG. 14) served by the base station 1420. The communication interface 1426 may be configured to facilitate a connection 1460 to the host computer 1410. The connection 1460 may be direct or it may pass through a core network (not shown in FIG. 14) of the telecommunication system and/or through one or more intermediate networks outside the telecommunication system. In the embodiment shown, the hardware 1425 of the base station 1420 further includes processing circuitry 1428, which may comprise one or more programmable processors, application-specific integrated circuits, field programmable gate arrays or combinations of these (not shown) adapted to execute instructions. The base station 1420 further has software 1421 stored internally or accessible via an external connection.

The communication system 1400 further includes the UE 1430 already referred to. Its hardware 1435 may include a radio interface 1437 configured to set up and maintain a wireless connection 1470 with a base station serving a coverage area in which the UE 1430 is currently located. The hardware 1435 of the UE 1430 further includes processing circuitry 1438, which may comprise one or more programmable processors, application-specific integrated circuits, field programmable gate arrays or combinations of these (not shown) adapted to execute instructions. The UE 1430 further comprises software 1431, which is stored in or accessible by the UE 1430 and executable by the processing circuitry 1438. The software 1431 includes a client application 1432. The client application 1432 may be operable to provide a service to a human or non-human user via the UE 1430, with the support of the host computer 1410. In the host computer 1410, an executing host application 1412 may communicate with the executing client application 1432 via the OTT connection 1450 terminating at the UE 1430 and the host computer 1410. In providing the service to the user, the client application 1432 may receive request data from the host application 1412 and provide user data in response to the request data. The OTT connection 1450 may transfer both the request data and the user data. The client application 1432 may interact with the user to generate the user data that it provides.

Figure 14:
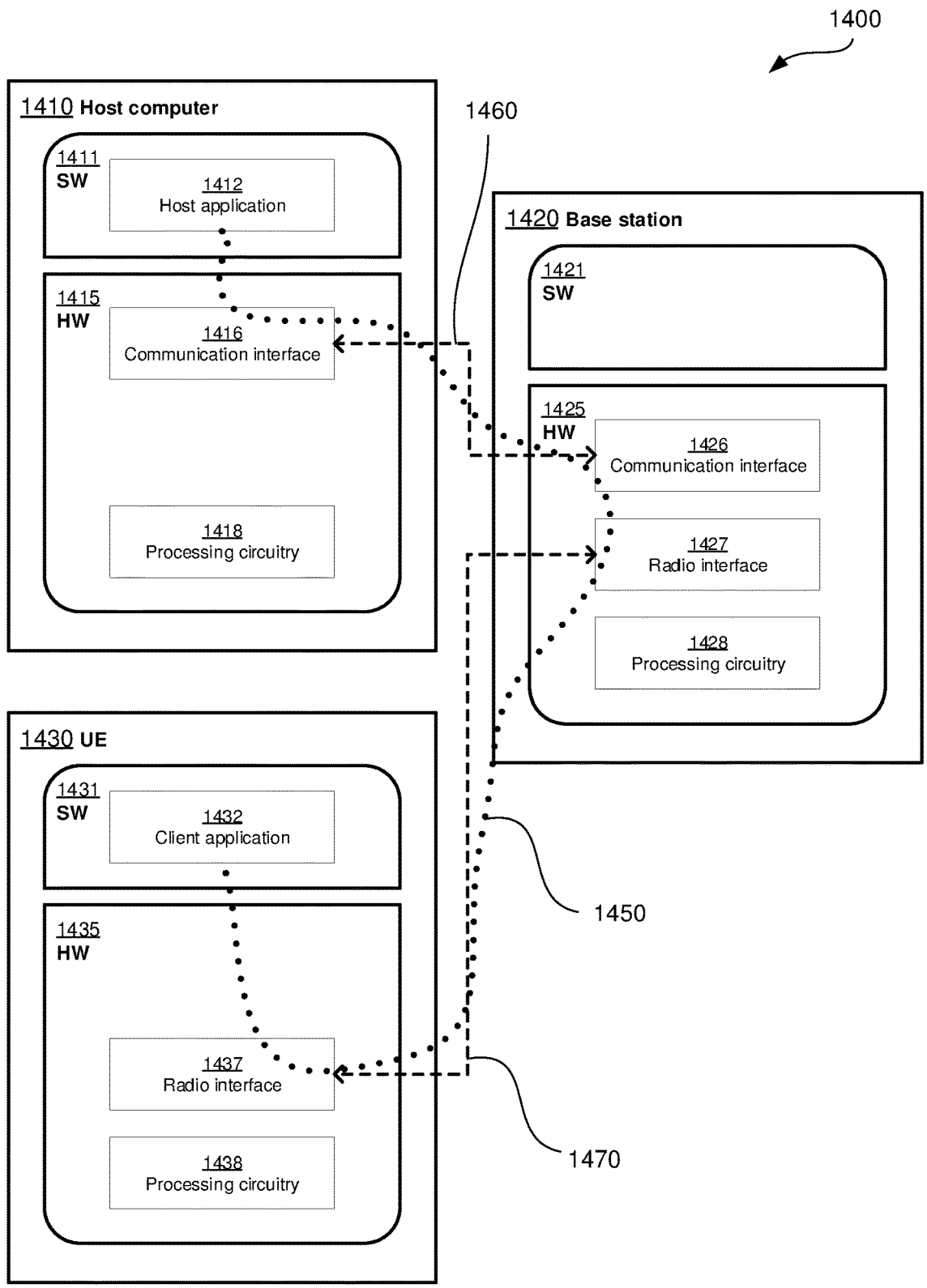
FIG. 14 is a generalized block diagram of a host computer communicating via a base station with a user equipment over a partially wireless connection, according to some embodiments.

It is noted that the host computer 1410, base station 1420 and UE 1430 illustrated in FIG. 14 may be identical to the host computer 1330, one of the base stations 1312a, 1312b, 1312c and one of the UEs 1391, 1392 of FIG. 13, respectively. This is to say, the inner workings of these entities may be as shown in FIG. 14 and independently, the surrounding network topology may be that of FIG. 13.

In FIG. 14, the OTT connection 1450 has been drawn abstractly to illustrate the communication between the host computer 1410 and the use equipment 1430 via the base station 1420, without explicit reference to any intermediary devices and the precise routing of messages via these devices. Network infrastructure may determine the routing, which it may be configured to hide from the UE 1430 or from the service provider operating the host computer 1410, or both. While the OTT connection 1450 is active, the network infrastructure may further take decisions by which it dynamically changes the routing (e.g., on the basis of load balancing consideration or reconfiguration of the network).

The wireless connection 1470 between the UE 1430 and the base station 1420 is in accordance with the teachings of the embodiments described throughout this disclosure, such as provided by nodes such as wireless device 50 and network node 30, along with the corresponding methods 1000 and 1100. The embodiments described herein enable a potential target node to have a better basis on which to decide whether to accept a requested preparation. This may involve transmission resources for a conditional handover/mobility procedure, including transmission resources for the concerned UE's bearers and a possible contention-free based random access (CFRA) preamble. With better input information to the admission control, the potential target node can have a more generous admission control policy, since more uncertain situations call for more conservative admission control policies. The teachings of these embodiments may improve the handover reliability, quality, latency and/or power consumption for the network and UE 1430 using the OTT connection 1450.

A measurement procedure may be provided for the purpose of monitoring data rate, latency and other factors on which the one or more embodiments improve. There may further be an optional network functionality for reconfiguring the OTT connection 1450 between the host computer 1410 and UE 1430, in response to variations in the measurement results. The measurement procedure and/or the network functionality for reconfiguring the OTT connection 1450 may be implemented in the software 1411 of the host computer 1410 or in the software 1431 of the UE 1430, or both. In embodiments, sensors (not shown) may be deployed in or in association with communication devices through which the OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of the OTT connection 1450 may include message format, retransmission settings, preferred routing etc.; the reconfiguring need not affect the base station 1420, and it may be unknown or imperceptible to the base station 1420. Such procedures and functionalities may be known and practiced in the art. In certain embodiments, measurements may involve proprietary UE signaling facilitating the host computer's 1410 measurements of throughput, propagation times, latency and the like. The measurements may be implemented in that the software 1411, 1431 causes messages to be transmitted, in particular empty or 'dummy' messages, using the OTT connection 1450 while it monitors propagation times, errors etc.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In a first step 1510 of the method, the host computer provides user data. In an optional substep 1511 of the first step 1510, the host computer provides the user data by executing a host application. In a second step 1520, the host computer initiates a transmission carrying the user data to the UE. In an optional third step 1530, the base station transmits to the UE the user data which was carried in the transmission that the host computer initiated, in accordance with the teachings of the embodiments described throughout this disclosure. In an optional fourth step 1540, the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In a first step 1610 of the method, the host computer provides user data. In an optional substep (not shown) the host computer provides the user data by executing a host application. In a second step 1620, the host computer initiates a transmission carrying the user data to the UE. The transmission may pass via the base station, in accordance with the teachings of the embodiments described throughout this disclosure. In an optional third step 1630, the UE receives the user data carried in the transmission.

Figures 17, 18:
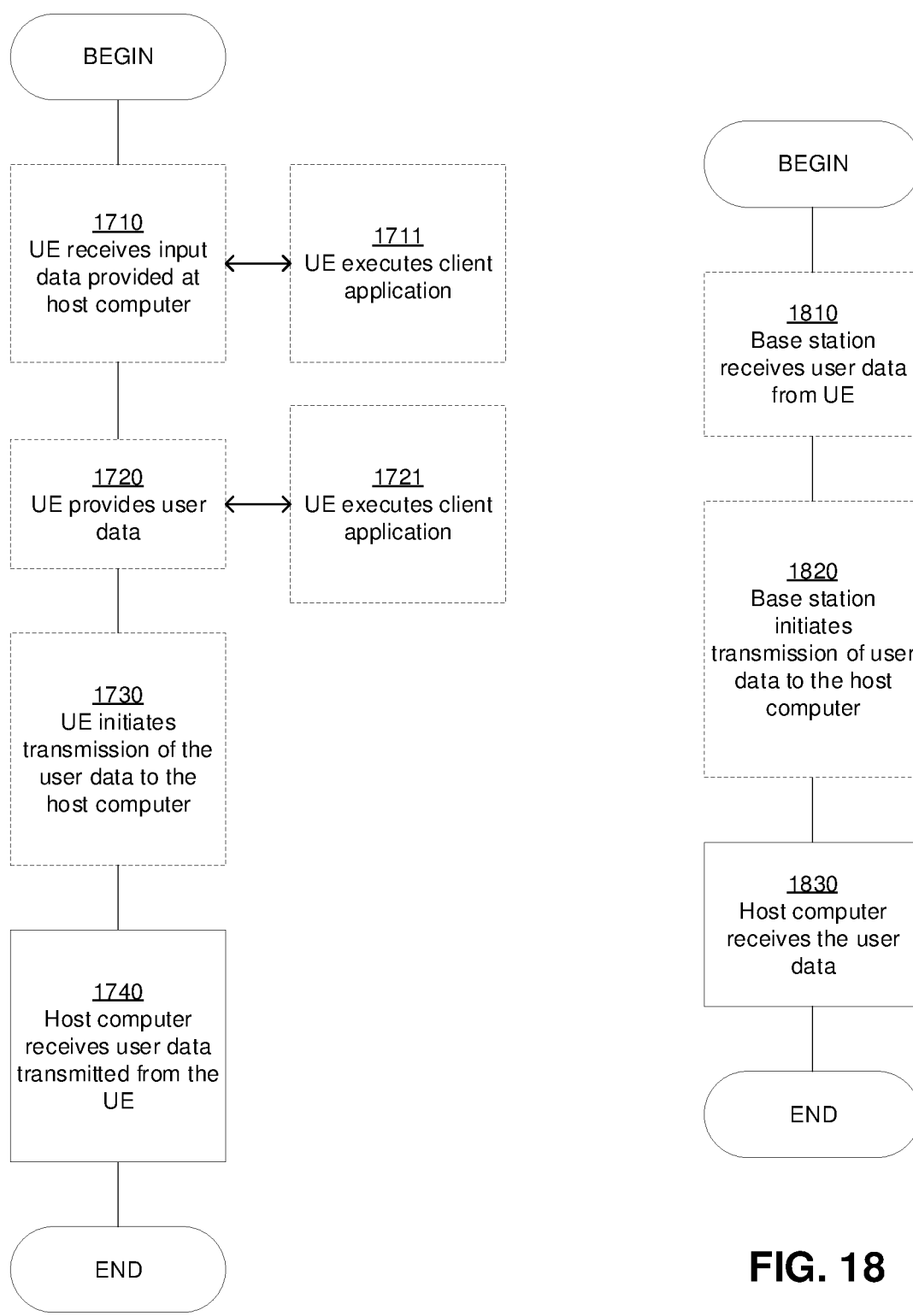

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In an optional first step 1710 of the method, the UE receives input data provided by the host computer. Additionally, or alternatively, in an optional second step 1720, the UE provides user data. In an optional substep 1721 of the second step 1720, the UE provides the user data by executing a client application. In a further optional substep 1711 of the first step 1710, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1730, transmission of the user data to the host computer. In a fourth step 1740 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In an optional first step 1810 of the method, in accordance with the teachings of the embodiments described throughout this disclosure, the base station receives user data from the UE. In an optional second step 1820, the base station initiates transmission of the received user data to the host computer. In a third step 1830, the host computer receives the user data carried in the transmission initiated by the base station.

As discussed in detail above, the techniques described herein, e.g., as illustrated in the process flow diagrams of FIGS. 10 and 11, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 19:
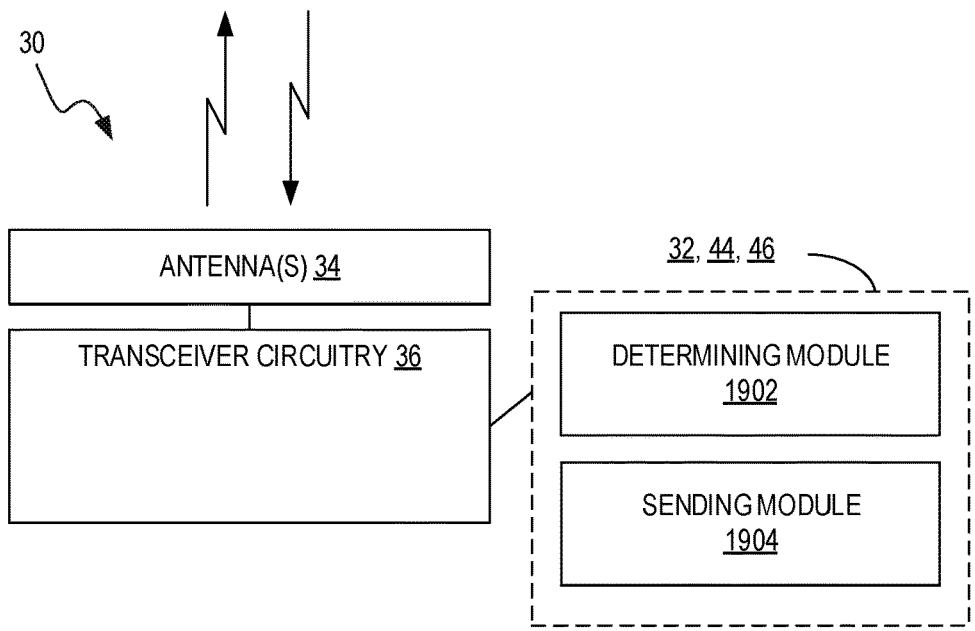
FIG. 19 is a block diagram illustrating a functional implementation of a network node, according to some embodiments.

FIG. 19 illustrates an example functional module or circuit architecture for a first network node 30 that includes a determining module 1902 for determining that a user equipment, UE, served by the source node is a candidate for conditional handover configuration and a sending module 1904 for sending, to a target node for conditional handover of the UE, a conditional handover request that includes one or more parameters indicative of a likelihood that handover of the UE to the target node will be executed.

Figure 20:
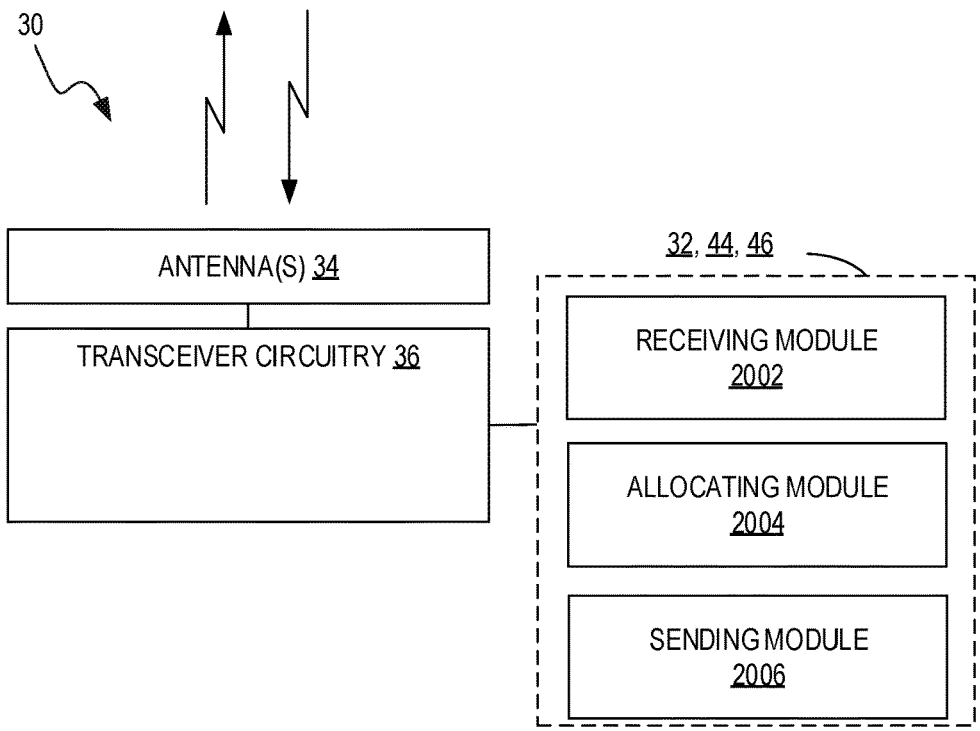
FIG. 20 illustrates another example functional module or circuit architecture for a network node, according to some embodiments.

FIG. 20 illustrates another example functional module or circuit architecture for a first network node 30 that includes a receiving module 2002 for receiving, from a source node serving a first user equipment, UE, a conditional handover request that includes one or more parameters indicative of a likelihood that handover of the first UE to the source node will be executed. The implementation includes an allocating module 2004 for allocating resources for the UE, wherein said allocating takes into account the likelihood that handover of the source UE to the source node will be executed and a sending module 2006 for sending handover configuration information for the first UE to the source node, in response to the conditional handover request.

EXAMPLE EMBODIMENTS

Example embodiments can include, but are not limited to, the following enumerated examples:

EE1. A method, in a first node operating in a wireless communication network, the method comprising:
  determining that a user equipment, UE, served by the first node is a candidate for conditional handover configuration;
  sending, to a target node for conditional handover of the UE, a conditional handover request that includes one or more parameters indicative of a likelihood that handover of the UE to the target node will be executed.

EE2. The method of example embodiment 1, wherein determining that the UE is a candidate for conditional handover configuration is based on measurement reports received from the UE.

EE3. The method of example embodiment EE1 or EE2, wherein the method further comprises:
  receiving handover configuration information from the target node, in response to the conditional handover request; and
  sending a conditional handover command to the UE, the conditional handover command comprising the handover configuration information and one or more parameters defining a trigger condition for execution of handover to the target node.

EE4. The method of any of example embodiments EE1-EE3, wherein the one or more parameters indicative of the likelihood that handover of the UE to the target node will be executed comprise a parameter representing a probability value, and wherein the method further comprises calculating the parameter representing the probability value based on any one or more of the following:
  a number of potential target cells for conditional handover of the UE;
  a difference between radio link conditions for executing conditional handover and reported radio link conditions for the UE;
  a speed or velocity of the UE;
  a doppler spread corresponding to the UE;
  a trigger condition for execution of handover to the target node; and
  historical data for conditional handovers of UEs served by the first node.

EE5. The method of any of example embodiments EE1-EE3, wherein the one or more parameters indicative of the likelihood that handover of the UE to the target node will be executed comprise any one or more of the following:
  a parameter representing a probability value;
  a parameter representing a number of potential target cells for conditional handover of the UE;
  a parameter representing a difference between radio link conditions for executing conditional handover and reported radio link conditions for the UE;
  a parameter representing a speed or velocity of the UE;
  a parameter representing a trigger condition for execution of handover to the target node.

EE6. The method of any of example embodiments EE1-EE5, the method further comprising:
  determining, after sending the conditional handover request to the target node, that the likelihood that handover of the UE to the target node will be executed has changed; and
  sending, to the target node, a message indicating the change in likelihood.

EE7. A method, in a first node operating in a wireless communication network, the method comprising:
  receiving, from a serving node serving a first user equipment, UE, a conditional handover request that includes one or more parameters indicative of a likelihood that handover of the first UE to the first node will be executed;
  allocating resources for the UE, wherein said allocating takes into account the likelihood that handover of the first UE to the first node will be executed; and
  sending handover configuration information for the first UE to the source node, in response to the conditional handover request.

EE8. The method of example embodiment EE7, wherein allocating resources for the first UE comprises one or more of:
  performing an admission control decision, taking into account the likelihood that handover of the first UE to the first node will be executed; and
  selecting a random access configuration to be allocated to the first UE for accessing the first node.

EE9. The method of example embodiment EE7 or EE8, wherein the method further comprises allocating resources for one or more other UEs, taking into account the likelihood that handover of the first UE to the first node will be executed EE10. The method of any of example embodiments EE7-EE9, wherein the one or more parameters indicative of the likelihood that handover of the first UE to the target node will be executed comprise a parameter representing a probability value, and wherein the allocating of resources for the first UE is based on the parameter representing the probability value.

EE11. The method of any of example embodiments EE7-EE9, wherein the one or more parameters indicative of the likelihood that handover of the first UE to the target node will be executed comprise and the allocating of resources for the first UE is based on any one or more of the following:
  a parameter representing a probability value;
  a parameter representing a number of potential target cells for conditional handover of the first UE;
  a parameter representing a difference between radio link conditions for executing conditional handover and reported radio link conditions for the first UE;
  a parameter representing a speed or velocity of the first UE;
  a parameter representing a trigger condition for execution of handover to the first node.

EE12. The method of any of example embodiments EE7-EE11, the method further comprising:
  setting a validity time for the handover configuration information for the UE, based on the likelihood that handover of the UE to the first node will be executed.

EE13. The method of any of example embodiments EE7-EE12, the method further comprising:

receiving, after sending the handover configuration information to the source node, a message indicating a change in likelihood that handover of the UE to the first node will be executed; and updating an allocation of resources to the first UE, in response to the change in likelihood.

EE14. The method of any of example embodiments EE7-EE12, the method further comprising:

receiving, after sending the handover configuration information to the source node, a message indicating a change in likelihood that handover of the UE to the first node will be executed; and allocating resources or updating allocations of resources for one or more other UEs, taking into account the change in likelihood.

EE15. A network node adapted to perform the methods of any of example embodiments EE1-EE14.

EE16. A network node comprising transceiver circuitry and processing circuitry operatively associated with the transceiver circuitry and configured to perform the methods of any of example embodiments EE1-EE14.

EE17. A computer program comprising instructions that, when executed on at least one processing circuit, cause the at least one processing circuit to carry out the method according to any one of example embodiments EE1-EE14.

EE18. A carrier containing the computer program of example embodiment EE17, wherein the carrier is one of an electronic signal, optical signal, radio signal, or computer readable storage medium.

A1. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the operations comprising embodiments EE1-EE14.

A2. The communication system of the previous embodiment further including the base station.

A3. The communication system of the previous two embodiments, further including the UE, wherein the UE is configured to communicate with the base station.

A4. The communication system of the previous three embodiments, wherein:

the processing circuitry of the host computer is configured to execute a host application, thereby providing the user data; and the UE comprises processing circuitry configured to execute a client application associated with the host application.

A5. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of embodiments EE1-EE14.

A6. The method of the previous embodiment, further comprising, at the base station, transmitting the user data.

A7. The method of the previous 2 embodiments, wherein the user data is provided at the host computer by executing a host application, the method further comprising, at the UE, executing a client application associated with the host application.

A8. A user equipment (UE) configured to communicate with a base station, the UE comprising a radio interface and processing circuitry configured to perform any of the previous 3 embodiments.

A9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of embodiments EE1-EE14.

A10. The communication system of the previous embodiment, wherein the cellular network further includes a base station configured to communicate with the UE.

A11. The communication system of the previous 2 embodiments, wherein:

the processing circuitry of the host computer is configured to execute a host application, thereby providing the user data; and the UE's processing circuitry is configured to execute a client application associated with the host application.

A12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of embodiments EE1-EE14.

A13. The method of the previous embodiment, further comprising at the UE, receiving the user data from the base station.

A14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of embodiments EE1-EE14.

A15. The communication system of the previous embodiment, further including the UE.

A16. The communication system of the previous 2 embodiments, further including the base station, wherein the base station comprises a radio interface configured to communicate with the UE and a communication interface configured to forward to the host computer the user data carried by a transmission from the UE to the base station.

A17. The communication system of the previous 3 embodiments, wherein:

the processing circuitry of the host computer is configured to execute a host application; and the UE's processing circuitry is configured to execute a client application associated with the host application, thereby providing the user data.

A18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

A19. A method implemented in a communication system including a host computer, a base station and a user equipment (UE), the method comprising:
at the host computer, receiving user data transmitted to the base station from the UE, wherein the UE performs any of the steps of any of embodiments EE1-EE14.

A20. The method of the previous embodiment, further comprising, at the UE, providing the user data to the base station.

A21. The method of the previous 2 embodiments, further comprising:
at the UE, executing a client application, thereby providing the user data to be transmitted; and
at the host computer, executing a host application associated with the client application.

A22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

A23. A communication system including a host computer comprising a communication interface configured to receive user data originating from a transmission from a User equipment (UE) to a base station, the base station comprising a radio interface and processing circuitry configured to communicate with the base station and cooperatively perform operations of any of embodiments EE1-EE10.

A24. The communication system of the previous embodiment further including the base station.

A25. The communication system of the previous two embodiments, further including the UE, wherein the UE is configured to communicate with the base station.

A26. The communication system of the previous three embodiments, wherein:
the processing circuitry of the host computer is configured to execute a host application; and
the UE is further configured to execute a client application associated with the host application, thereby providing the user data to be received by the host computer.

A27. A method implemented in a communication system including a host computer, a base station and a user equipment (UE), the method comprising:
at the host computer, receiving, from the base station, user data originating from a transmission which the base station has received from the UE, wherein the UE performs any of the steps of any of embodiments EE1-EE14.

A28. The method of the previous embodiment, further comprising at the base station, receiving the user data from the UE.

A29. The method of the previous 2 embodiments, further comprising at the base station, initiating a transmission of the received user data to the host computer.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

What is claimed is:

1. A method, in a source node operating in a wireless communication network, the method comprising:
determining that a user equipment (UE) served by the source node is a candidate for conditional handover configuration;
sending, to a target node for conditional handover of the UE, a conditional handover request that includes one or more parameters indicative of a likelihood that handover of the UE to the target node will be executed, wherein the one or more parameters indicative of the likelihood that handover of the UE to the target node will be executed comprise a parameter representing a probability value.

2. The method of claim 1, wherein determining that the UE is a candidate for conditional handover configuration is based on measurement reports received from the UE.

3. The method of claim 1, wherein the method further comprises:
receiving handover configuration information from the target node, in response to the conditional handover request; and
sending a conditional handover command to the UE, the conditional handover command comprising the handover configuration information and one or more parameters defining a trigger condition for execution of handover to the target node.

4. The method of claim 1, wherein the method further comprises calculating the parameter representing the probability value based on any one or more of the following:
a number of potential target cells for conditional handover of the UE;
a difference between radio link conditions for executing conditional handover and reported radio link conditions for the UE;
a speed or velocity of the UE;
a Doppler spread corresponding to the UE;
a trigger condition for execution of handover to the target node; and
historical data for conditional handovers of UEs served by the source node.

5. The method of claim 1, wherein the one or more parameters indicative of the likelihood that handover of the UE to the target node will be executed comprise any one or more of the following:

a parameter representing a number of potential target cells for conditional handover of the UE;
a parameter representing a difference between radio link conditions for executing conditional handover and reported radio link conditions for the UE;
a parameter representing a speed or velocity of the UE;
a parameter representing a trigger condition for execution of handover to the target node.

6. The method of claim 1, the method further comprising:
determining, after sending the conditional handover request to the target node, that the likelihood that handover of the UE to the target node will be executed has changed; and
sending, to the target node, a message indicating the change in likelihood.

7. A method, in a target node operating in a wireless communication network, the method comprising:
receiving, from a source node serving a first user equipment (UE) a conditional handover request that includes one or more parameters indicative of a likelihood that handover of the first UE to the target node will be executed, wherein the one or more parameters indicative of the likelihood that handover of the UE to the target node will be executed comprise a parameter representing a probability value;
allocating resources for the UE, wherein said allocating is based on the parameter representing the probability value and takes into account the likelihood that handover of the first UE to the target node will be executed; and
sending handover configuration information for the first UE to the source node, in response to the conditional handover request.

8. The method of claim 7, wherein allocating resources for the first UE comprises one or more of:
performing an admission control decision, taking into account the likelihood that handover of the first UE to the target node will be executed; and
selecting a random access configuration to be allocated to the first UE for accessing the target node.

9. The method of claim 7, wherein the method further comprises allocating resources for one or more other UEs, taking into account the likelihood that handover of the first UE to the target node will be executed.

10. The method of claim 7, wherein the one or more parameters indicative of the likelihood that handover of the first UE to the target node will be executed comprise and the allocating of resources for the first UE is based on any one or more of the following:
a parameter representing a number of potential target cells for conditional handover of the first UE;
a parameter representing a difference between radio link conditions for executing conditional handover and reported radio link conditions for the first UE;
a parameter representing a speed or velocity of the first UE;
a parameter representing a trigger condition for execution of handover to the target node.

11. The method of claim 7, the method further comprising:
setting a validity time for the handover configuration information for the UE, based on the likelihood that handover of the UE to the target node will be executed.

12. The method of claim 7, the method further comprising:
receiving, after sending the handover configuration information to the source node, a message indicating a change in likelihood that handover of the UE to the target node will be executed; and
updating an allocation of resources to the first UE, in response to the change in likelihood.

13. The method of claim 7, the method further comprising:
receiving, after sending the handover configuration information to the source node, a message indicating a change in likelihood that handover of the UE to the target node will be executed; and
allocating resources or updating allocations of resources for one or more other UEs, taking into account the change in likelihood.

14. A source network node comprising:
communication interface circuitry configured to communicate with one or more other nodes in a wireless communication network; and
processing circuitry operatively associated with the communication interface circuitry, wherein the processing circuitry is configured to:
determine that a user equipment (UE) served by the source network node is a candidate for conditional handover configuration;
send to a target node for conditional handover of the UE, using the communication interface circuitry, a conditional handover request that includes one or more parameters indicative of a likelihood that handover of the UE to the target node will be executed, wherein the one or more parameters indicative of the likelihood that handover of the UE to the target node will be executed comprise a parameter representing a probability value.

15. The source network node of claim 14, wherein the one or more parameters indicative of the likelihood that handover of the UE to the target node will be executed further comprise any one or more of the following:
a parameter representing a number of potential target cells for conditional handover of the UE;
a parameter representing a difference between radio link conditions for executing conditional handover and reported radio link conditions for the UE;
a parameter representing a speed or velocity of the UE;
a parameter representing a trigger condition for execution of handover to the target node.

16. The source network node of claim 14, wherein the method further comprises calculating the parameter representing the probability value based on any one or more of the following:
a number of potential target cells for conditional handover of the UE;
a difference between radio link conditions for executing conditional handover and reported radio link conditions for the UE;
a speed or velocity of the UE;
a Doppler spread corresponding to the UE;
a trigger condition for execution of handover to the target node; and
historical data for conditional handovers of UEs served by the source node.

17. A target network node comprising:
communication interface circuitry configured to communicate with one or more other nodes in a wireless communication network; and
processing circuitry operatively associated with the communication interface circuitry, wherein the processing circuitry is configured to:

receive, from a source node serving a first user equipment (UE) a conditional handover request that includes one or more parameters indicative of a likelihood that handover of the first UE to the target network node will be executed, wherein the one or more parameters indicative of the likelihood that handover of the UE to the target node will be executed comprise a parameter representing a probability value;

allocate resources for the UE, based on the parameter representing a probability value and taking into account the likelihood that handover of the first UE to the target network node will be executed; and send handover configuration information for the first UE to the source node, in response to the conditional handover request.

18. The target network node of claim 17, wherein the one or more parameters indicative of the likelihood that handover of the UE to the target node will be executed further comprise any one or more of the following:

a parameter representing a number of potential target cells for conditional handover of the UE;

a parameter representing a difference between radio link conditions for executing conditional handover and reported radio link conditions for the UE;

a parameter representing a speed or velocity of the UE;

a parameter representing a trigger condition for execution of handover to the target node.

* * * * *